United States Patent
Siomina et al.

(10) Patent No.: US 9,515,783 B2
(45) Date of Patent: Dec. 6, 2016

(54) SYSTEMS AND METHODS FOR CONFIGURING FEEDBACK TRANSMISSIONS IN A WIRELESS NETWORK

(71) Applicant: TELEFONAKTIEBOLAGET L M ERICSSON (PUBL), Stockholm (SE)

(72) Inventors: Iana Siomina, Solna (SE); Shaohua Li, Beijing (CN); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 74 days.

(21) Appl. No.: 14/385,513

(22) PCT Filed: Mar. 16, 2013

(86) PCT No.: PCT/IB2013/052115
§ 371 (c)(1),
(2) Date: Sep. 16, 2014

(87) PCT Pub. No.: WO2013/136314
PCT Pub. Date: Sep. 19, 2013

(65) Prior Publication Data
US 2015/0109986 A1    Apr. 23, 2015

(30) Foreign Application Priority Data
Mar. 16, 2012 (WO) ............... PCT/CN2012/072429

(51) Int. Cl.
*H04L 1/18* (2006.01)
*H04L 5/00* (2006.01)
(Continued)

(52) U.S. Cl.
CPC .............. *H04L 1/189* (2013.01); *H04J 11/005* (2013.01); *H04L 1/1854* (2013.01);
(Continued)

(58) Field of Classification Search
CPC ...... H04L 1/189; H04L 1/1854; H04L 1/1887; H04L 5/0055; H04L 5/0073
See application file for complete search history.

(56) References Cited

U.S. PATENT DOCUMENTS

2007/0183451 A1* 8/2007 Lohr ..................... H04L 1/1678
                                                         370/473
2009/0147740 A1  6/2009 Kim
(Continued)

OTHER PUBLICATIONS

R4-115130, Further considerations on ABS pattern design, NEC, Zhuhai, Oct. 10-14, 2011.
(Continued)

*Primary Examiner* — Albert T Chou

(57) ABSTRACT

A method of configuring the communication of feedback information in a wireless communication network includes obtaining information pertaining to an interference condition. The interference condition relates to interference experienced by a wireless communication device. The method also includes selecting one of a synchronous feedback type and an asynchronous feedback type for the wireless communication device based on the obtained information. Additionally, the method includes receiving and/or transmitting feedback information for an uplink transmission in accordance with the selected feedback type.

30 Claims, 13 Drawing Sheets

(51) Int. Cl.
  *H04L 12/18* (2006.01)
  *H04W 24/10* (2009.01)
  *H04W 72/08* (2009.01)
  *H04W 4/08* (2009.01)
  *H04W 72/00* (2009.01)
  *H04W 4/06* (2009.01)
  *H04W 24/02* (2009.01)
  *H04J 11/00* (2006.01)
  *H04L 1/12* (2006.01)
  *H04W 72/04* (2009.01)

(52) U.S. Cl.
  CPC .......... *H04L 1/1887* (2013.01); *H04L 5/0032* (2013.01); *H04L 5/0053* (2013.01); *H04L 5/0055* (2013.01); *H04L 5/0073* (2013.01); *H04L 12/1877* (2013.01); *H04W 4/06* (2013.01); *H04W 4/08* (2013.01); *H04W 24/02* (2013.01); *H04W 24/10* (2013.01); *H04W 72/005* (2013.01); *H04W 72/042* (2013.01); *H04W 72/0413* (2013.01); *H04W 72/082* (2013.01); *H04L 2001/125* (2013.01); *H04W 72/0426* (2013.01)

(56) References Cited

U.S. PATENT DOCUMENTS

| | | | | |
|---|---|---|---|---|
| 2012/0026991 | A1* | 2/2012 | Niu | H04B 7/0417 370/338 |
| 2012/0106476 | A1* | 5/2012 | Song | H04W 72/082 370/329 |
| 2013/0114573 | A1* | 5/2013 | Suzuki | H04L 1/1887 370/336 |
| 2014/0126512 | A1* | 5/2014 | Kim | H04L 5/0073 370/329 |

OTHER PUBLICATIONS

Mediatek Inc: "Time Shifting and Almost Blank Subframe for Intercell Interference Coordination", 3GPP Draft; R1-104547, 3rd Generation Partnership Project (3GPP), Mobile Competence Centre; 650, Route Des Lucioles, F-06921 Sophia-Antipolis Cedex, France, vol. RAN WG1, no. Madrid,Spain; 20100823, Aug. 18, 2010, XP050450105, [retrieved on Aug. 18, 2010] the whole document.

Huawei: "LTE non-CA based HetNet support", 3GPP Draft; R1-101982, 3rd Generation Partnership Project(3GPP), Mobile Competence Centre; 650, Route Des Lucioles; F-06921 Sophia-Antipolis Cedex; France, vol. RAN WG1, no. Beijing, china; 20100412, Apr. 6, 2010, XP050419319, [retrieved on Apr. 6, 2010] the whole document.

NTTDOCOMO: "Interference Coordination for Non-CA-based Heterogeneous Networks", 3GPP Draft; R1-102307ICIC for Non-CA Hetnet, 3rd Generation Partnership Project (3GPP), Mobile Competence Centre; 650, Routedes Lucioles; F-06921 Sophia-Antipolis Cedex; France, vol. RAN WG1,no. Beijing, china; 20100412, Apr. 7, 2010, XP050419698, [retrieved on Apr. 7, 2010] the wholedocument.

* cited by examiner

FIGURE 3

SYSTEMS AND METHODS FOR CONFIGURING FEEDBACK TRANSMISSIONS IN A WIRELESS NETWORK

This application claims the benefit of International Application No. PCT/CN2012/072429, filed Mar. 16, 2012 and International Application No. PCT/IB2013/052115, filed Mar. 16, 2013, the disclosure of which is fully incorporated herein by reference.

CLAIM OF PRIORITY

The present application claims the benefit of PCT Patent Application Serial No. PCT/CN2012/072429, filed on Mar. 16, 2012, entitled Methods for Reliable Reception of HARQ Feedback Information in Heterogeneous Deployments, the disclosure of which is incorporated herein in its entirety by reference.

TECHNICAL FIELD OF THE INVENTION

This disclosure relates in general to wireless communication and, more particularly, to improving the reliability of wireless transmissions.

BACKGROUND OF THE INVENTION

The dramatic increase in the use and availability of communication services in recent years has placed significantly greater demands on wireless communication networks. Continually increasing requirements for coverage, throughput, and reliability have driven many developments in the design and configuration of wireless networks. One example of this has been the development of "heterogeneous" networks in which conventional macro-cell base stations are supplemented by the deployment of various types of "low-power" nodes that provide lower maximum transmission power levels than conventional macro-cell base stations. These low-power nodes are often smaller and cheaper, both to manufacture and to operate, than conventional macro-cell access nodes.

Heterogeneous deployments provide a mechanism for increasing network densities and for adapting to changes in traffic needs and operating environment. However, heterogeneous deployments bring unique challenges that may hinder efficient network operation and degrade user experience. The reduced transmission power typically associated with low-power nodes can result in an increased sensitivity to interference. Additionally, the mix of large and small cells in a heterogeneous deployment can lead to other challenges, as a result of the asymmetric power capabilities of the different cells. As a result, there is a need for effective solutions to reduce inter-cell interference in heterogeneous deployments and other advanced networks.

SUMMARY OF THE INVENTION

In accordance with the present disclosure, certain disadvantages and problems associated with wireless communication have been substantially reduced or eliminated. In particular, certain devices and techniques for providing wireless telecommunication service are described.

In accordance with one embodiment of the present disclosure, a method of configuring the communication of feedback information in a wireless communication network includes obtaining information pertaining to an interference condition. The interference condition relates to interference experienced by a wireless communication device. The method also includes selecting one of a synchronous feedback type and an asynchronous feedback type for the wireless communication device based on the obtained information. Additionally, the method includes receiving and/or transmitting feedback information for an uplink transmission in accordance with the selected feedback type.

In accordance with another embodiment of the present disclosure, an apparatus for configuring communication in a wireless communication system includes a transmitter and a processor. The transmitter is configured to transmit configuration information to a wireless communication device indicating a selected feedback type. The processor is configured to obtain information pertaining to an interference condition. The interference condition relates to interference experienced by a wireless communication device. The processor is also configured to select one of a synchronous feedback type and an asynchronous feedback type for the wireless communication device based on the obtained information. The processor is further configured to receive feedback information for an uplink transmission in accordance with the selected feedback type.

Important technical advantages provided by certain embodiments of the present disclosure include improved reliability in wireless communications. Particular embodiments may be capable of reducing inter-cell interference experienced by wireless communication devices, especially in heterogeneous networks. Such embodiments may be capable of reducing the number of erroneous transmissions and/or increasing the likelihood that wireless transmissions will be successfully received. Additionally, in particular embodiments, the reduction in interference can be achieved with minimal impact on the throughput of the interfering cell. Other advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 3 is a diagram showing possible MBSFN-configurable subframes according to an example frame configuration;

DETAILED DESCRIPTION OF THE INVENTION

Figure 1A:
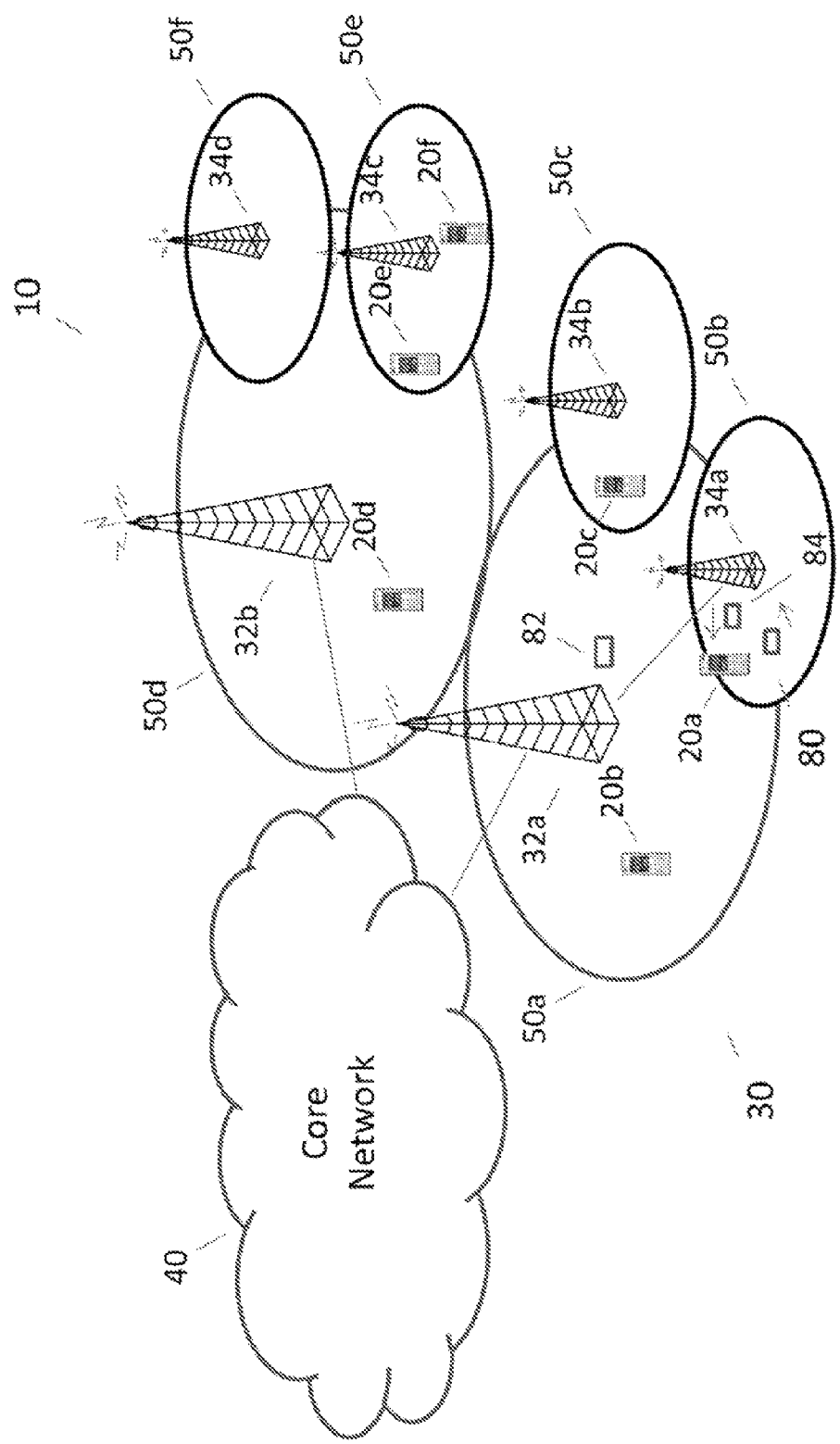
FIGS. 1A-1C illustrate particular embodiments of a wireless communication system in which the described solutions may be implemented.

FIG. 1A illustrates a wireless communication system 10 that provides communication service to one or more wireless communication devices 20. Wireless communication system 10 includes an access network 30 that provides wireless access to communication services within a particular geographic area and a core network 40 that provides backhaul delivery of information within wireless communication system 10. Access network 30 includes multiple radio access nodes including, in certain embodiments, multiple different types of radio access nodes (e.g., both base stations 32 and low-power nodes 34). Each radio access node serves one or more cells 50. Because of the close proximity (and potential overlap) of the cells 50, a wireless communication device 20 operating in a first cell 50 (referred to herein as a "victim cell") may suffer interference due to transmissions occurring in a second cell 50 (referred to herein as an "aggressor cell") that is overlapping or near to the victim cell. This aggressor cell may be served by the same radio access node as the victim cell or by a different radio access node.

Additionally, as noted above, access network 30 may represent a heterogeneous network in which radio access nodes transmitting at different power levels are deployed. This may create more severe interference problems, especially when the victim cell is served by a radio access node using a higher power than the radio access node serving the interfering cell—e.g., for FIG. 1A, in situations in which the victim cell is served by one of low-power nodes 34 and the aggressor cell is served by one of base stations 32.

Figure 1B:
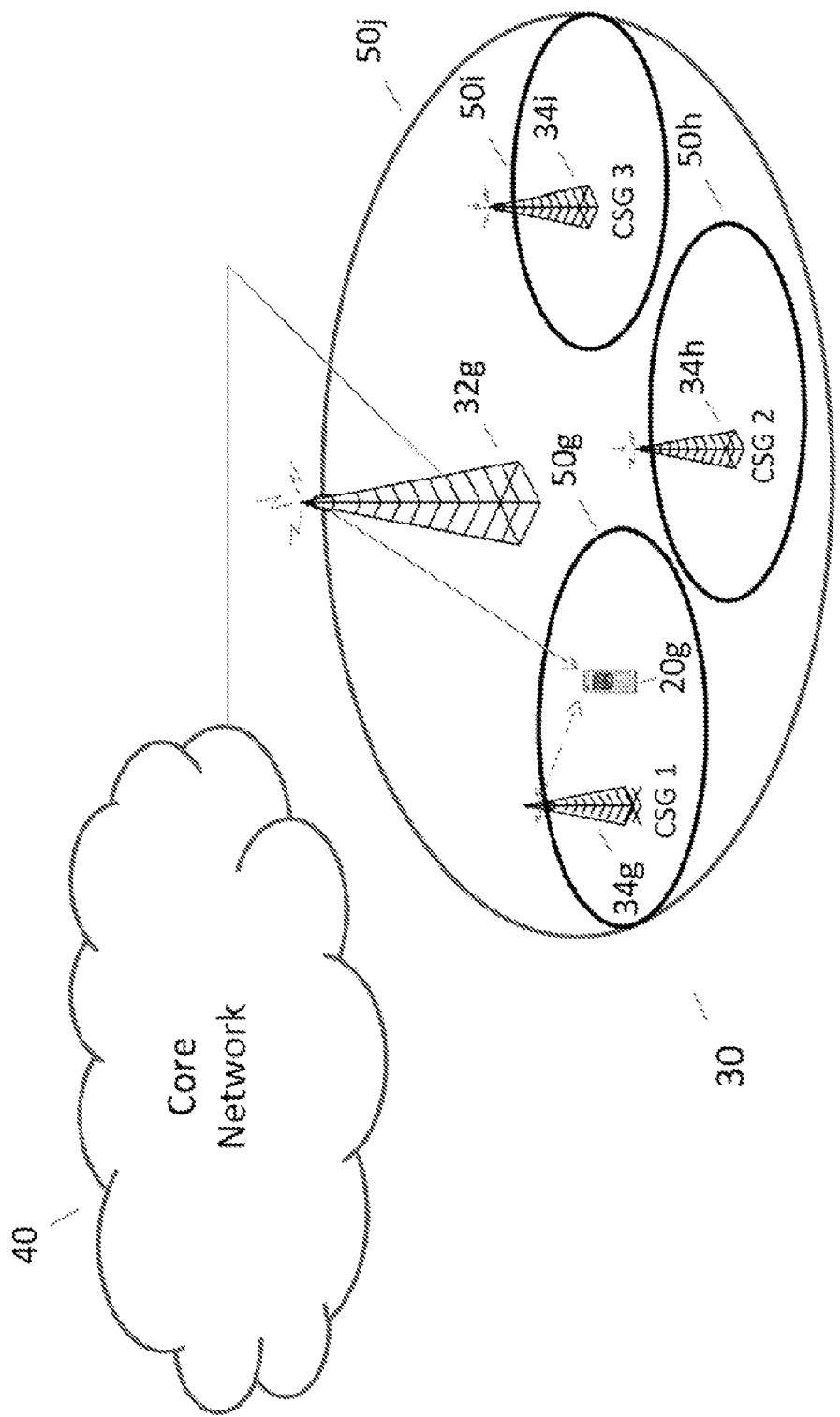

These interference problems may be even further exacerbated by certain solutions that are commonly implemented in heterogeneous networks that utilize certain types of low-power nodes 34. For example, FIG. 1B illustrates problems that may arise in certain embodiments of wireless communication system 10 when one or more low-power nodes 34 are configured to utilize closed subscribed groups (CSGs). In the example of FIG. 1B, one or more low-power nodes 34 are configured to utilize a CSG. The use of CSGs may allow low-power nodes 34 to limit access to their services to certain authorized users that are part of a "closed subscriber group." A radio access node configured with a CSG will provide communication services to wireless communication devices 20 that are members of the CSG, but deny service to wireless communication devices 20 that are not members of that node's CSG. For example, a picocell operated by an employer to provide service for its employees in their workplace could be configured with a CSG that includes the wireless communication devices 20 of all the company's employees. By using the CSG, this low-power node 34 could provide additional or better service coverage to the company's employees beyond that provided by nearby base stations 32 but may still prevent non-employees in the area from tying up the picocell's transmission, reception, or processing resources.

Thus, non-CSG wireless communication devices 20 that are operating in a cell 50 served by a CSG low-power node 34 cannot utilize CSG low-power node 34, even though the CSG low-power node 34 may be the closest radio access node. On the other hand, wireless transmissions made by the CSG low-power node 34 may still interfere with communications between these non-CSG wireless communication devices 20 and other radio access nodes serving them. Moreover, non-CSG wireless communication devices 20 may be located extremely close to the CSG low-power node 34 despite being unable to obtain service from the CSG low-power node 34, which may result in a significant amount of interference for the non-CSG wireless communication devices 20. For instance, in the example shown in FIG. 1B, it is assumed that wireless communication device 20g is not a member of the CSG served by low-power node 34g and cannot obtain service from low-power node 34g. Instead, wireless communication device 20g is served by base station 32g in cell 50j. As a result, cell 34g served by CSG low-power node 34g may act as an aggressor cell while wireless communication device 20 is operating in the portion of cell 50j that overlaps cell 34g. The interference from this aggressor cell 50g may be extremely high wireless communication device 20g is operating very close to low-power node 34g.

Figure 1C:
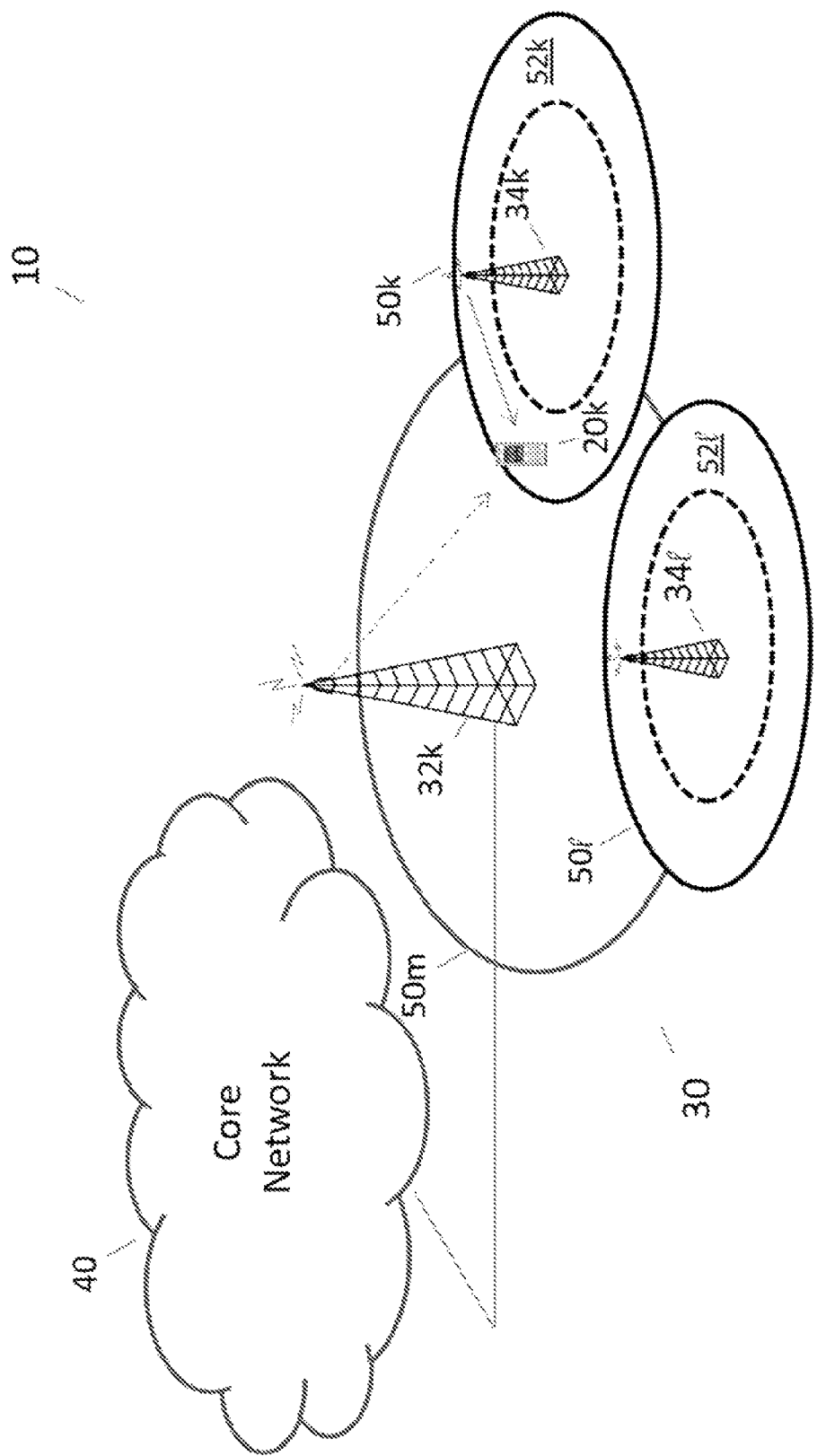

Another interference problem that may arise, especially in heterogeneous networks, relates to the use of "cell range expansion" (or "cell range extension") (CRE) zones. FIG. 1C illustrates an example in which one or more low-power nodes 34 are configured to support CREs. In CREs, cell selection/re-selection diverges from a conventional signal-strength-based (e.g., RSRP-based) approach towards, for example, a pathloss- or pathgain-based approach, thereby extending the coverage of the lower-power cell to include additional areas (represented by CRE zones 52 in FIG. 1C). The larger a particular CRE zone 52 is, the weaker serving cell's signal strength will be near its boundary. This may result in nearby macro cells acting as aggressor cells to wireless communication devices 20 operating in a CRE zone 52. For example, in FIG. 1C, cell 50m served by base station 32k may act as an aggressor cell for wireless communication device 20k operating in CRE zone 52k of low-power node 34k. Thus, in general, as shown by FIGS. 1A-1C inter-cell interference can be a significant concern in wireless communication systems, particularly in those implementing heterogeneous deployments.

It may be critical to protect certain types of signaling from such inter-cell interference. For example, certain embodiments of wireless communication system 10, such as those supporting Long-Term Evolution (LTE), may utilize Hybrid-Automatic Repeat reQuest (HARQ) functionalities for transmission error correction. In particular embodiments, HARQ functionality provides an N-process Stop-And-Wait mechanism that transmits and retransmits transport blocks. Upon reception of a transport block, the receiver makes an attempt to decode the transport block and informs the transmitter about the outcome of the decoding operation by transmitting feedback information (e.g., a single-bit acknowledgement (ACK) for successful reception or negative acknowledgement (NAK) for unsuccessful reception) indicating whether the decoding was successful and/or whether a retransmission of the transport block is required. If interference from an aggressor cell prevents feedback information of this type from being successfully transmitted, a significant number of unnecessary retransmissions may occur and/or erroneously received transmissions may never be retransmitted.

Additionally, HARQ may also be used for contention-based random access transmissions, both for a first scheduled uplink transmission (e.g., for initial access, after handover, or upon RRC connection reestablishment) and for contention resolution in downlink (where HARQ feedback is transmitted only by the wireless communication device 20 which detects its own identity, as provided in message 3, echoed in a Contention Resolution message). HARQ failure in the first uplink transmission step or in the contention resolution step may result, for example, in a cell radio network temporary identity (C-RNTI) detection failure by the relevant wireless communication device 20 or erroneous assignment of the same C-RNTI also to another wireless communication device 20.

Figure 4:
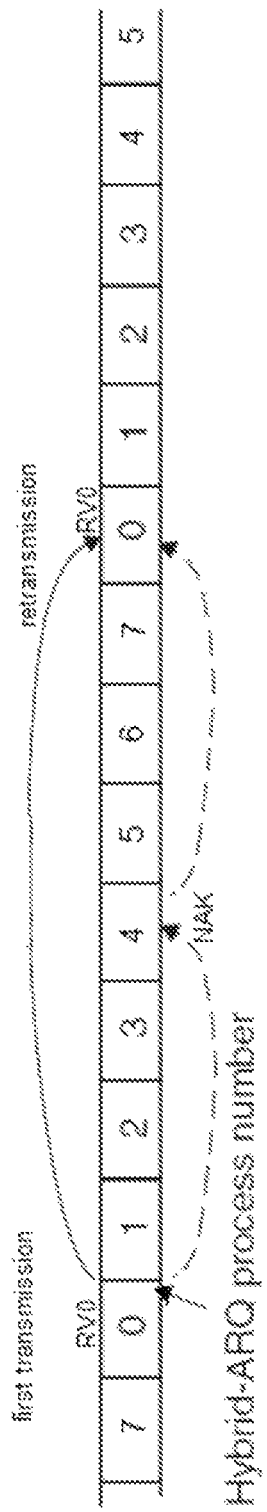
FIG. 4 illustrates timing for Hybrid-Automatic Repeat reQuest (HARQ) signaling according to an example synchronous HARQ scheme.

Certain embodiments of wireless communication system 10 utilize "synchronous HARQ" for some or all of their transmissions. For example, LTE implementations use synchronous HARQ for uplink user data transmissions on the Uplink Shared CHannel (UL-SCH), providing HARQ feedback information in the downlink on a Physical Hybrid-ARQ Indicator CHannel (PHICH). Synchronous HARQ involves synchronous HARQ feedback and synchronous retransmissions. In such embodiments, the time instants for downlink transmissions of feedback information and any uplink retransmissions are fixed based on the subframe(s) scheduled for the uplink transmissions and known to both the radio access node and the relevant wireless communication device 20. Consequently, there may not be any need to signal a HARQ process number when operating in this HARQ mode. The maximum number of retransmissions may be configured per wireless communication device 20. An example of synchronous HARQ operation is shown in FIG. 4.

In particular embodiments of wireless communication system 10, transmissions in aggressor cells may be constrained by predetermined transmission patterns that limit downlink transmissions made by the radio access nodes serving those cells. These transmission patterns may limit the time and/or frequency resources that are used for making downlink transmissions in the relevant cell. As a result, these transmission patterns may provide a victim cell protection from interference by an aggressor cell in other time and/or frequency resources.

For example, wireless communication system 10 may configure radio access nodes to utilize Almost Blank Subframe (ABS) patterns that result in these radio access nodes transmitting a minimal amount of signaling during certain subframes. In particular embodiments, ABS patterns define low-power and/or low-transmission activity subframes (e.g., subframes in which a reduced number of modulation symbols are transmitted or some other reduction in the amount of data or signaling occurs) for the relevant cell 50. For example, an ABS pattern for a potential aggressor cell may specify a number of subframes during which no user data is transmitted in the aggressor cell, although control channel information may still be transmitted during the relevant subframes. In particular embodiments, ABS patterns may be exchanged between radio access nodes (e.g., via an X2 interface).

Furthermore, in particular embodiments, the inter-cell interference caused by an aggressor cell may be significantly reduced during those ABS subframes that are also configured as Multicast and Broadcast Single Frequency Network (MBSFN) subframes. In certain embodiments, MBSFN subframes are divided into a non-MBSFN region and an MBSFN region. For example, the non-MBSFN region may span the first one or two orthogonal frequency division multiplexing (OFDM) symbols in an MBSFN subframe with the length of the non-MBSFN region being 1 or 2 symbols (e.g., one symbol may be used with 1 or 2 cell-specific ports when the number of resource blocks exceeds 10). In such embodiments, the MBSFN region in an MBSFN subframe may then be defined as the OFDM symbols that do not make up part of the non-MBSFN region. While some MBSFN subframes may carry multicast transmissions, such as Physical Multicast Channel (PMCH) transmission, not all MBSFN subframes include such transmissions, despite their name. MBSFN subframes without multicast transmissions are referred to herein as "blank MBSFN subframes."

Figure 2B:
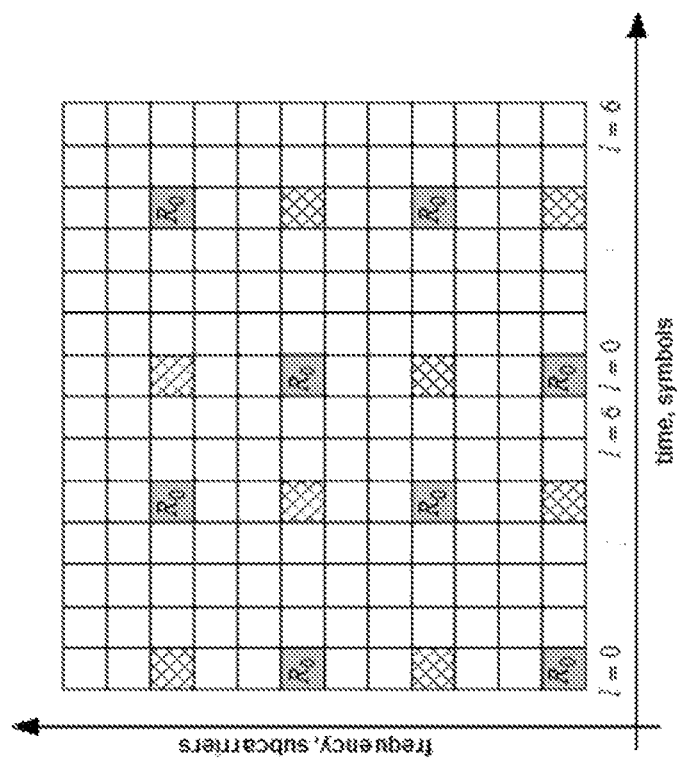
FIGS. 2A and 2B illustrate example transmission patterns for a subframe configured as, respectively, a Multicast and Broadcast Single Frequency Network (MBSFN) Almost Blank Subframe (ABS) subframe and a non-MBSFN ABS subframe.
Figure 2A:
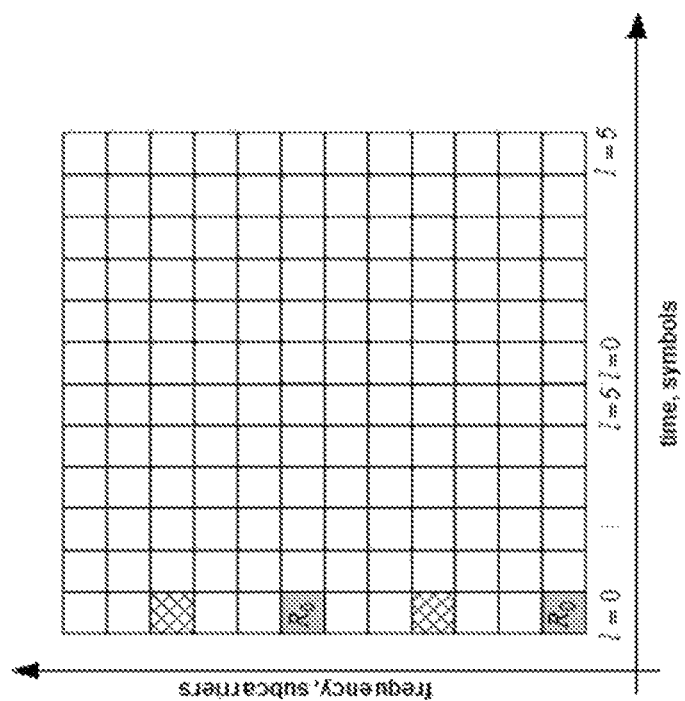

Nonetheless, even in blank MBSFN subframes, certain types of signaling may still be transmitted in part of the non-MBSFN region. For example, in LTE networks, common reference signals (CRS) may still be transmitted in the non-MBSFN region of the of blank MBSFN subframes, namely in the first symbol. However, unlike ABS configured in non-MBSFN subframes (a "non-MBSFN ABS configuration"), ABS configured in blank MBSFN subframes (an "MBSFN ABS configuration") may result in less inter-cell interference due to the fact that certain information (e.g., CRS in LTE networks) is not transmitted in the MBSFN region of MBSFN subframes. A subframe diagram for an example MBSFN ABS configuration that may be used in particular embodiments of wireless communication system 10 is schematically illustrated in FIG. 2A, while a subframe diagram for an example non-MBSFN ABS configuration that may be used in particular embodiments is schematically illustrated in FIG. 2B. In the examples of FIGS. 2A and 2B, it is assumed that two transmit antenna ports are used for CRS with transmissions shown for the first port (marked with "R0") and the second port (marked with crosshatching). As can be seen from FIGS. 2A and 2B, when a potential aggressor cell is configured with MBSFN ABS, transmissions will occur in fewer symbols per subframe than with non-MBSFN ABS, resulting in less overall interference from an aggressor cell configured with MBSFN ABS.

Figure 3:
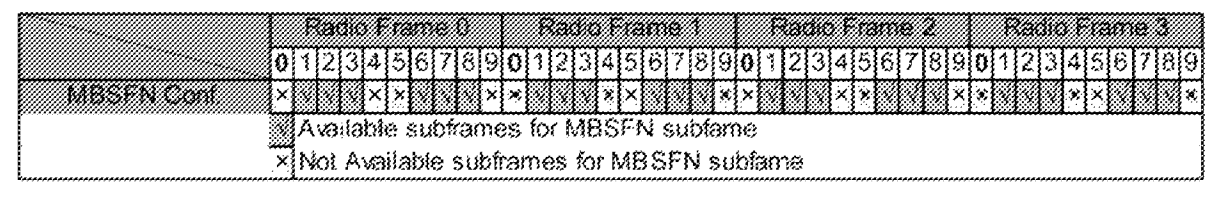

However, not all downlink (DL) subframes may be MBSFN-configurable. FIG. 3 shows an example of how MBSFN configuration is constrained under the 3GPP TS 36.331 specification for Long Term Evolution (LTE) networks when Frequency Division Duplex (FDD) is utilized. As shown in FIG. 3, MBSFN cannot be configured in subframes #0, #4, #5, #9 in an FDD system, since some system information may need to be transmitted in these subframes. Thus, in such embodiments, only subframes #1, #2, #3, #6, #7, and #8 can be configured as MBSFN subframes. By contrast to the FDD constraints shown in FIG. 3, in Time Division Duplex (TDD) LTE systems, only subframes #3, #4, #7, #8, and #9 can be configured for MBSFN. While it might be possible to use a mixture of MBSFN and non-MBSFN ABS to protect more subframes, mixing MBSFN and non-MBSFN ABS subframes can produce other problems, such as inaccurate cell state information reports, less efficient demodulation algorithms for wireless communication devices 20 with advanced receivers, unnecessary constraints on network configuration, and reduced throughput in the aggressor cell. Additionally, some of the available MBSFN subframes may need to be used for purposes other than interference cancellation. Thus, wireless communication system 10 may not have enough MBSFN cells available for ABS to protect all the downlink subframes in the victim cell that it is necessary or desirable to protect.

This means that MBSFN subframes can only be used to reduce interference at certain times and, in particular embodiments, the time periods that can be protected may change from network to network.

Thus, constraints on how aggressor cell transmission patterns can be configured may make it impossible to protect all the necessary transmission resources in the victim cell from interference using a transmission pattern such as an MBSFN ABS pattern. For example, assume the HARQ timing in a particular embodiment of wireless communication system 10 is based on an 8 ms periodicity, which is consistent with the HARQ periodicity set for LTE. If an uplink grant is first allocated in subframe n, HARQ feedback information (e.g., an ACK/NAK indication) will be sent on the PHICH channel of subframes (n+8k) mod(10), where k is any positive integer value and mod(.) is the modulus after division. When n is an odd number, Subframes 1, 9, 7, 5, and 3 will have ACK/NAK information for the corresponding HARQ process. In this case, although Subframe 9 and 5 would need protection, these subframes would not MBSFN-configurable in the example illustrated by FIG. 3. When n is an even number, downlink HARQ feedback information will be transmitted in Subframes 0, 8, 6, 4, and 2 for the corresponding HARQ process. In this case, Subframes 0 and 4 need protection, but are not MBSFN-configurable either under the example of FIG. 3.

Figure 5:
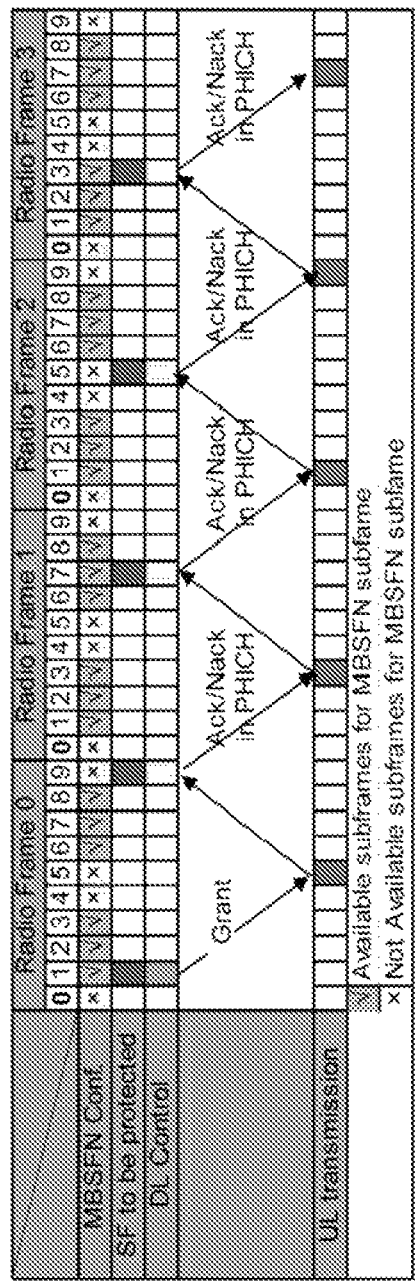
FIG. 5 illustrates the timing of HARQ signaling under the example synchronous HARQ scheme relative to that of an example Almost Blank Subframes (ABS) pattern that may be used to protect downlink transmissions.

To illustrate how this may cause problems, FIG. 4 illustrates timing for a HARQ signaling sequence under an example synchronous HARQ scheme, while FIG. 5 shows the timing of HARQ signaling under the example synchronous HARQ scheme relative to that of an example Almost Blank Subframes (ABS) pattern. In the example synchronous HARQ scheme, the timing relationship between the uplink data transmission and the downlink feedback transmission and/or any possible retransmissions may be fixed. For instance, in the example shown in FIG. 4, a wireless communication device 20 transmits an uplink data transmission during a particular subframe and the radio access node serving this wireless communication device 20 transmits a responsive HARQ feedback transmission a fixed number of subframes after the uplink transmission. In the illustrated example, the HARQ feedback transmission is made 4 subframes after the corresponding uplink transmission, and the HARQ round trip time (RTT) is 8 subframes. Because the MBSFN ABS configuration used in an aggressor cell may not match an 8 subframe periodicity (as shown, for example, by FIG. 3), the subframes during which a responsive downlink transmission might occur could include subframes that are unprotected, or that receive less protection, by the ABS configuration of an aggressor cell.

An example of such a scenario is shown in FIG. 5. In particular, FIG. 5 shows an example of the timing relationship between the synchronous HARQ signaling that may occur in the victim cell and the ABS configuration in the aggressor cell. As FIG. 5 illustrates problems may arise if a fixed timing relationship between the uplink transmission and its related downlink transmission is maintained. It may be necessary to protect the PHICH transmission in the victim cell by configuring MBSFN ABS subframes in the aggressor cell or via some other mechanism if a wireless communication device 20 in the victim cell is going to have any chance of successfully receiving and decoding the PHICH transmissions. In the example of FIG. 5, the subframes in a victim cell that require or would significantly benefit from protection by MBSFN ABS subframes in the aggressor cell are shown in the row labeled "SF to be protected." As indicated by FIG. 5, under this example configuration, Subframe 9 of Radio Frame 0 and Subframe 5 of Radio Frame 2 cannot be protected with MBSFN ABS subframe, since MBSFN cannot be configured in these subframes in this example. Consequently, only some of the resulting PHICH transmissions can be protected by MBSFN ABS subframes, and without more, some PHICH transmissions will not be detected reliably due to the configuration constraints for MBSFN subframes and the fixed timing relationship between the uplink transmission and the responsive HARQ transmission.

This is an example of a more generic problem that may occur in particular embodiments as a result of a mismatch in the periodicity of the relevant downlink transmissions (e.g., HARQ feedback information transmitted on PHCIH) and that of a transmission pattern (e.g., an MBSFN ABS pattern) that provides appropriate interference conditions to protect downlink transmissions in the victim cell. While it may be possible to protect some of the downlink transmissions in a victim cell by simply taking advantage of a transmission pattern configured for the aggressor cell (e.g., an MBSFN ABS pattern), it may not be possible to protect all downlink transmissions made in the victim cell in this manner because of the fixed timing relationship between the uplink transmissions and the corresponding downlink transmissions. In general, when there is a restriction (e.g., due to subframe type such as MBSFN/non-MBSFN, cyclic prefix configuration, interference conditions, network configuration, device activity state) on the time and/or frequency resources that can be protected from interference by the aggressor cell and at the same time there are predetermined time occasions when certain downlink transmissions need to occur in the victim cell (e.g., due to the timing constraints of synchronous HARQ), these predetermined time occasions may not fully encompass all of the subframes that could possibly be needed for downlink transmissions. Therefore, in embodiments of wireless communication system 10 that exhibit a periodicity mismatch between a pattern of subframes that can be interference-protected and the downlink transmissions that require such protection, it may be impossible to protect all downlink transmissions needing protection without additional measures being taken.

As a result, wireless communication system 10 is configured to control the time and/or frequency resources used for certain downlink transmissions in a victim cell to ensure that the relevant downlink transmissions coincide with a predefined, feasible subset of "candidate" resources that are or can be interference protected. More specifically, particular embodiments of wireless communication system 10, wireless communication devices 20 and radio access nodes may be capable of switching between a synchronous type of feedback and an asynchronous type of feedback to allow greater flexibility in the timing of downlink feedback transmissions. As a result, the relevant downlink transmissions in a victim cell can be made using candidate transmission resources (e.g., candidate subframes) that are protected from interference by an aggressor cell. For example, in an embodiment in which HARQ feedback is used to trigger retransmission of erroneous transmissions in the victim cell and MBSFN ABS subframes are configured in the aggressor cell, a wireless communication device 20 and its serving radio access node can switch to asynchronous HARQ to permit HARQ feedback information to be transmitted during an MBSFN ABS subframe of the aggressor cell, even in situations in which timing constraints of synchronous HARQ operation would force the feedback to be transmitted in a non-ABS subframe. In particular embodiments, these candidate subframes may represent subframes in which transmissions by base station 32a in the aggressor cell are limited in some way (e.g., the subframes configured as ABS subframes under the ABS configuration), subframes in which low-power node 34a or access network 30 has designated as being acceptable for certain or all interference sensitive operations (e.g., the subframes identified by a restricted measurement pattern configured for wireless communication device 20a), or some combination of the two. Alternatively, in some embodiments, the candidate subframes may depend on an ability of the wireless communication device 20 to handle high-interference associated with transmissions in the aggressor cell and/or a receiver type for a receiver of wireless communication device 20 (e.g., an indication of its ability to handle or mitigate certain types of interference). More generally, the candidate resources may represent any time and/or frequency resources that satisfy a candidate condition that relates in any suitable manner to transmissions in an aggressor cell during the relevant subframes.

Returning now to the example embodiment shown in FIG. 1A, the illustrated embodiment of wireless communication system 10 provides wireless communication service to one or more wireless communication devices 20 operating within a plurality of cells 50 served by wireless communication system 10. Wireless communication system 10 may support communication of any suitable type and/or in accordance with any appropriate communication standards including, but not limited to, any Long Term Evolution (LTE), Worldwide Interoperability for Microwave Access (WiMAX), and Wideband Code Division Multiple Access (WCDMA) communication standards.

Wireless communication device 20 represents any device capable of communicating information wirelessly with wireless communication system 10. Examples of wireless communication device 20 include traditional communication devices such as wireless phones, personal digital assistants ("PDAs"), laptop computers, and any other portable communication device suitable for use with communication system 10. For example, in particular embodiments, wireless communication device 20 represents an instance of LTE user equipment (UE). Additionally, in particular embodiments, wireless communication device 20 may also represent automated equipment or devices capable of machine-type communication (MTC). For example, wireless communication device 20 may represent a wireless meter or sensor, a digital billboard, a wireless-capable appliance (e.g., a washing machine, furnace, digital video recorder (DVR)), or any other device capable of wireless communication with access network 30.

Access network 30 communicates wirelessly with wireless communication devices 20 and serves as an interface between wireless communication devices 20 and core network 40. Access network 30 may represent or include a radio access network and/or any elements responsible for providing a radio or air interface for core network 40. Access network 30 includes one or more radio access nodes capable of communicating wirelessly with wireless communication devices 20. In the example embodiment of FIG. 1A, these radio access nodes include a plurality of base stations 32 and low-power nodes 34. Access network 30 may also include base station controllers, access servers, gateways, relays, repeaters, and/or any additional components suitable for managing radio channels used by base station 32, authenticating users, controlling handoffs between base station 32 and other radio access elements, and/or otherwise managing the interoperation of base stations 32 and interfacing base stations 32 with core network 40.

In particular embodiments, access network 30 may represent a heterogeneous network in which multiple different types of radio access nodes are deployed. For example, in the illustrated example of FIG. 1A, access network 30 includes a plurality of base stations 32 that each serve one or more cells 50 and a plurality of low-power nodes 34 that each serve one or more cells. For purposes of this description, cells 50 served by base stations 32 are referred to as "macro" cells, while cells 50 served by low-power stations 34 are referred to as "micro" cells. In particular embodiments, micro-cells served by low-power stations 34 may substantially overlap one or more macro-cells served by nearby base stations 32, as shown in FIG. 1A.

Base stations 32 communicate wirelessly with wireless communication devices 20 to facilitate wireless communication service for wireless communication devices 20. Base stations 32 may include any appropriate elements to communicate with wireless communication devices 20 and to interface wireless communication devices 20 with core network 40. For example, depending on the communications standards supported by access network 30 and core network 40, each base station 32 may represent or include a base station, a Node B, an evolved Node B (eNode B), a radio base station (RBS), or any other suitable element capable of communicating with wireless communication devices 20 wirelessly.

Similarly, low-power nodes 34 communicate wirelessly with wireless communication devices 20 to facilitate wireless communication service for wireless communication devices 20. Low-power nodes 34 may also include any appropriate elements to communicate with wireless communication devices 20 and to interface wireless communication devices 20 with core network 40. In particular embodiments, low-power nodes 34 may have a lower maximum transmission power than base stations 32, or may be configured to use lower transmission powers than base stations 32. Examples of low-power nodes 34 include, but are not limited to, pico base stations, femto base stations, micro base stations, home eNodeBs (HeNBs), and wireless local access network (WLAN) access points.

Although referred to as being "low-power," low-power nodes 34 may, in particular embodiments, include identical physical components to base stations 32 but, at a given time, may be simply configured to operate differently from base stations 32. Furthermore, although the description below focuses, for purposes of example, on embodiments in which access network includes radio access nodes that differ in terms of transmission power, other embodiments of access network 30 may include differing types of radio access nodes that differ in regards to other aspects of their operations and/or other capabilities or characteristics. Moreover, alternative embodiments of access network 30 may represent homogeneous networks in which all of the radio access nodes are similar or identical.

Each radio access node in access network 30 is associated with one or more cells 50 that is served by that radio access node. Cells 50 may define an approximate geographical area served by the corresponding radio access node. For purposes of simplicity, FIG. 1A illustrates an example embodiment in which each radio access node is configured to serve a single cell 50. However, in particular embodiments, the radio access nodes may be capable of supporting multiple different cells 50. For example, in embodiments that support carrier aggregation or other multicarrier features, a particular radio access node may serve multiple different cells 50, possibly with identical geographic coverage, with each of the cells 50 served by that radio access node using a carrier from a different portion of the frequency spectrum. As a result, in particular embodiments, a first cell 50 and a second cell 50 may both be served by the same radio access node, and those cells 50 may cover identical, overlapping, or completely distinct geographical areas.

Core network 40 routes voice and/or data communicated by wireless communication devices 20 from access network 30 to other wireless communication devices 20 or to other communication devices coupled to core network 40 through landline connections or through other networks. Core network 40 may support any appropriate standards or techniques for routing such communications. For example, in embodiments of wireless communication devices 20 that support LTE, core network 40 may represent a System Architecture Evolution (SAE) core network. Core network 40 may also be responsible for aggregating communication for longhaul transmission, authenticating users, controlling calls, metering usage for billing purposes, or other functionality associated with providing communication services. In general, however, core network 40 may include any components suitable for routing and otherwise supporting voice and/or data communications for wireless communication devices 20.

In operation, radio access nodes of wireless communication system 10 (such as base stations 32 and low-power nodes 34 in the example embodiment) provide wireless communication service to wireless communication devices 20 operating in the cells 50 served by these radio access nodes. To protect certain downlink transmissions from inter-cell interference, the timing of these downlink transmissions is controlled to ensure that these transmissions occur in certain subframes (referred to herein as "candidate subframes"). These candidate subframes represent subframes in which one or more aggressor cells will have limited or no transmissions, overall interference in the victim cell will be reduced, and/or other desirable transmission conditions will occur for the victim cell. For example, in particular embodiments, the candidate subframes may represent those subframes, or a specific subset of those subframes, in which an aggressor cell is configured to transmit MBSFN ABS subframes. In particular embodiments, these candidate subframes may represent subframes in which transmissions by base station 32a in the aggressor cell are limited in some way (e.g., the subframes configured as ABS subframes under the ABS configuration), subframes in which low-power node 34a or access network 30 has designated as being acceptable for certain or all interference sensitive operations (e.g., the subframes identified by a restricted measurement pattern configured for wireless communication device 20a), or some combination of the two. Alternatively, in some embodiments, the candidate subframes may depend on an ability of the wireless communication device 20 to handle high-interference associated with transmissions in the aggressor cell and/or a receiver type for a receiver of wireless communication device 20 (e.g., an indication of its ability to handle or mitigate certain types of interference). More generally, the candidate subframes may represent any subframes that satisfy a candidate condition that relates in any suitable manner to transmissions in an aggressor cell during the relevant subframes.

To facilitate error correction of uplink transmissions transmitted by wireless communication devices 20, radio access nodes of access network 30 transmit feedback information to wireless communication devices 20 indicating successful or failed reception of uplink transmissions made by wireless communication devices 20. In particular embodiments of wireless communication system 10, wireless communication system 10 may support multiple types of feedback schemes. The schemes supported by individual elements of wireless communication system 10 (e.g., individual radio access nodes and wireless communication devices 20) may vary, and not all elements of wireless communication system 10 may support all of the feedback schemes supported by wireless communication system 10 overall.

In particular embodiments, one or more of wireless communication devices 20 are capable of supporting one or multiple different types of "synchronous" feedback schemes under which radio access nodes (such as base stations 32 and low-power nodes 34) abide by a fixed timing relationship between the timing of an uplink transmission and the timing of a responsive downlink transmission providing feedback indicating whether the uplink transmission was successfully received. For instance, an example synchronous feedback scheme may require a radio access node to transmit feedback information about an uplink transmission four subframes after the relevant wireless communication device 20 was scheduled to make the uplink transmission.

In particular embodiments, one or more of wireless communication devices 20 are additionally capable of supporting one or multiple different types of "asynchronous" feedback schemes under which radio access nodes have increased flexibility in regards to the timing of a feedback information transmission relative to that of the corresponding uplink transmission. For example, particular embodiments of wireless communication system 10 may implement an example asynchronous feedback scheme in which a radio access node can transmit feedback information regarding an uplink transmission any time after the uplink transmission has occurred. In particular embodiments, an asynchronous feedback scheme may still impose a minimum and/or a maximum limit on the amount of time between the uplink transmission and the corresponding downlink feedback transmission but allow the radio access node to determine an appropriate time for the downlink transmission that satisfies the limit(s). Although the timing of feedback and/or retransmissions may be constrained in some manner under an asynchronous feedback scheme (e.g., within a particular range), the exact number of subframes between the initial data transmission and the responsive feedback transmission and/or data retransmissions is not fixed when using an asynchronous type of feedback scheme.

As a result, a radio access node in a victim cell may be able to align a downlink transmission of feedback information with a candidate subframe when utilizing an asynchronous type of feedback scheme in situations in which the timing constraints required by a synchronous type of feedback scheme would force the downlink transmission to be made in a subframe that is not a candidate subframe. Thus, by selectively utilizing an asynchronous type of feedback, wireless communication system 10 may be able to protect downlink transmissions that it would otherwise be unable to protect with a synchronous type of feedback.

As explained above, various elements of wireless communication system 10 may be capable of adapting the type of feedback they transmit and/or receive to better protect feedback information transmissions from inter-cell interference. Thus, wireless communication devices 20, radio access nodes (e.g., base stations 32 and low-power nodes 34), or both may be configured to choose an appropriate type of feedback scheme to use. In particular embodiments, the decision of what type of feedback scheme to use may be based on an interference condition that relates to interference experienced by the relevant wireless communication device 20. This interference condition may relate in any way to actual interference experienced by that wireless communication device 20 or to estimated or anticipated interference experienced by wireless communication device 20 (based, e.g., on the characteristics of its serving cell, the operation of potential aggressor cells). In some embodiments that utilize an interference condition, the interference condition and the candidate condition may represent the same condition so that the condition that distinguishes individual candidate subframes may also be the condition that is used as the basis for selecting between feedback types.

As one example, in particular embodiments of wireless communication system 10, an asynchronous type of feedback scheme is used with wireless communication devices 20 served by low-power nodes. Consequently, in such embodiments, the interference condition might relate to a device type for the serving radio access node, to whether a maximum transmission power of a radio access node serving the relevant wireless communication device exceeds a threshold, to whether the relevant wireless communication device 20 has been configured with a restricted measurement pattern, to whether the relevant wireless communication device 20 has received interference assistance data from access network 30, or any other factor that may indicate that the serving node is a "low-power" node. As another example, in particular embodiments of wireless communication system 10, an asynchronous type of feedback is used with wireless communication devices 20 operating in areas within their serving cell in which the signal strength of the serving cell is sufficiently weakened. Consequently, in such embodiments, the interference condition might relate to whether the relevant wireless communication device 20 is operating within a cell range expansion (CRE) zone or another portion of its serving cell in which the signal strength of the serving cell is known or determined to be sufficiently weakened.

As another example, in particular embodiments of wireless communication system 10, an asynchronous feedback scheme may be used with certain TDD DL/UL configurations, because it may be more difficult to align feedback transmissions with candidate subframes in the aggressor cell if the victim cell is using certain TDD configurations. Consequently, in such embodiments, the interference condition may relate to the TDD UL/DL configuration used in the victim cell. For example, in particular embodiments that implement LTE, an asynchronous feedback scheme may be used with wireless communication devices 20 that are operating, for example, in a cell configured with LTE TDD UL/DL Configuration #0, while a synchronous feedback scheme may be used with wireless communication devices 20 that are operating, for example, in a cell configured with LTE TDD UL/DL Configuration #1.

As yet another example, in particular embodiments of wireless communication device 20, the choice between an asynchronous or synchronous type of feedback scheme may made based on a transmission pattern used by an aggressor cell. Consequently, in such embodiments, the interference condition may relate to a transmission pattern used by one or more potential aggressor cells.

As yet another example, in particular embodiments of wireless communication system 10, an asynchronous type of feedback scheme may be used with wireless communication devices 20 that are scheduled to transmit on persistent or semi-persistent resources. Consequently, in such embodiments, the interference condition might relate to whether the serving cell is utilizing persistent or semi-persistent scheduling for the relevant wireless communication devices 20.

As yet a further example, wireless communication devices 20 may use an asynchronous type feedback schemes based on an actual amount of interference measured by the wireless communication devices 20, a signal strength of the serving cell and/or one or more aggressor cells, or a signal quality of the serving cell and/or one or more aggressor cells. Consequently, in such embodiments, the interference condition may relate to interference measurements, signal strength measurements, and/or channel quality estimates performed by wireless communication devices 20.

In yet other embodiments, the interference condition might relate to a capability of the relevant wireless communication device 20 to mitigate inter-cell interference or to particular mitigation techniques currently being used by the relevant wireless communication device 20. In such embodiments, a synchronous type of feedback scheme may be selected when the relevant wireless communication device 20 is applying a first mitigation technique and an asynchronous type of feedback scheme may be applied when the relevant wireless communication device 20 applies a second mitigation technique.

In yet further embodiments, the interference condition might relate to a capability of the relevant wireless communication device 20 and/or its serving radio access node to support one or both of a synchronous and an asynchronous type of feedback scheme or a capability to adaptively switch between a synchronous and an asynchronous type of feedback scheme; a power level being used by the serving radio access node to transmit the feedback information (e.g., whether a power level of the feedback channel differs from a reference power level by more than a threshold amount) and/or any other suitable condition or combination of conditions (including any of the above conditions). In general, the choice between a synchronous and an asynchronous type of feedback scheme may be made based on any suitable factors.

As noted above, the decision of which type of feedback scheme to use may be made by a wireless communication device 20, by its serving radio access node, or by both devices. The decision may be made by one device and communicated to the other (implicitly or explicitly), or both devices may make the decision independently based on the same considerations. In embodiments in which wireless communication devices 20 are responsible for deciding whether to use synchronous or asynchronous feedback, a wireless communication device 20 may make the decision autonomously or according to a predetermined rule or rules communicated by its serving node, and then communicate to its serving radio access node an indication of whether synchronous or asynchronous feedback will be used.

To facilitate the decision, one or both of the wireless communication device 20 and the serving radio access node may transmit to the other device capability information that indicates a capability of the transmitting device to support one or both of a synchronous and an asynchronous type of feedback scheme or a capability to adaptively switch between a synchronous and an asynchronous type of feedback scheme. In some embodiments, the decision of whether to use synchronous or asynchronous feedback may be based on this capability information. Additionally, the serving radio access node may forward such information to other radio access nodes. For example, the serving radio access node may transmit capability information of information of the wireless communication device 20 and/or the serving radio access node itself to a neighboring radio access node when a handover occurs. Similarly, the wireless communication device 20 or the serving radio access node may also transmit capability information to other elements of access network 30 (e.g., an enhanced Serving Mobile Location Center or other type of positioning node).

Additionally, in particular embodiments, the reported capability information may contain additional information beyond a basic indication of what types of feedback schemes the reporting device supports. In particular embodiments, the capability information may identify scenarios for which the reporting device supports a specified capability. For example, a wireless communication device 20 may report capability information that indicates that the wireless communication device 20 supports a specific capability only when using a restricted measurement pattern or only when operating in a heterogeneous network or only when using a specific TDD configuration(s). The capability information may also indicate whether the wireless communication device 20 can determine whether to adapt its scheme for downlink feedback autonomously, based on pre-defined rules, by implicit signaling, by explicit signaling, or a combination thereof.

After a decision is made regarding whether synchronous or asynchronous feedback is to be used, the relevant wireless communication device 20 and/or its serving radio access node may configure themselves to use the selected feedback scheme. For example, if a decision is made (by a wireless communication device 20 or its serving radio access node) to use asynchronous feedback, the relevant wireless communication device 20 may configure itself to receive feedback for an uplink transmission without knowing the exact subframe in which the feedback information will be sent. This may involve using a HARQ process number or some other information to identify the uplink transmission associated with the received feedback information.

Additionally, the wireless communication device 20 in question and/or its serving radio access node may configure other aspects of their operation based on the feedback decision. For example, the serving radio access node may, based on the decision, schedule uplink or downlink transmissions, transmit uplink scheduling grants, attempt to configure an aggressor node (e.g., set an ABS pattern for the aggressor node or request that the aggressor node use MBSFN ABS), adjust discontinuous reception (DRX) or discontinuous transmission (DTX) parameters for the relevant wireless communication device 20, set a transmit power for a particular channel, configure a restricted measurement pattern for the relevant wireless communication device 20, adapt its uplink channel estimation procedures, adapt its radio link management (RLM) procedures, modify its feedback procedures for downlink data transmissions (e.g., adjust downlink HARQ retransmissions), and/or otherwise configure its operation in accordance with the selected feedback type. Similarly, the relevant wireless communication device 20 may, based on the decision, adjust its DRX or DTX parameters, adapt its power-saving algorithms, modify its measurements (e.g., change the timing of its measurements), adapt its RLM procedures (e.g., RLM sampling), and/or otherwise configure its operation in accordance with the selected feedback type.

Once the relevant wireless communication device 20 and its serving radio access node are configured to use the selected feedback type, the relevant wireless communication device 20 may begin making uplink data transmissions using the selected feedback type. Its serving radio access node will respond to these uplink transmissions with downlink feedback transmissions according to the selected feedback type. If the selected feedback type is synchronous, then the serving radio access node will transmit downlink feedback transmissions in accordance with the fixed time constraints required for the relevant synchronous type of feedback. For instance, if using the example synchronous feedback scheme described above, the serving radio access node will transmit downlink feedback information 4 subframes after the uplink data transmission was scheduled.

However, if the selected feedback type is asynchronous, then the serving radio access node may not transmit the downlink feedback information a fixed amount of time after the uplink transmission, and instead transmit the feedback information during one of the subframes protected from interference by the aggressor cell. For example, the serving radio access node may wait a specific minimum number of subframes after the uplink data transmission is scheduled to be transmitted, and then transmit the downlink feedback information during the next candidate subframe. As a result, the serving radio access node may be able to protect the downlink feedback transmission from interference by the aggressor cell in situations in which it would not have been possible if the serving radio access node had been forced to satisfy the timing requirements associated with a synchronous feedback scheme.

To illustrate, FIG. 1A shows an example in which wireless communication device 20a is responsible for determining whether it should use a synchronous or asynchronous type of feedback after connecting to low-power node 34a. In the illustrated example, wireless communication device 20a transmits capability information 80 to low-power node 34a at some point after entering cell 50b. Wireless communication device 20a may transmit capability information 80 during setup or call setup (e.g. when establishing the RRC connection, a bearer, a session of a specific type) or at any other appropriate time. If wireless communication device 20 was already being served by wireless communication device 20, wireless communication device 20 may transmit capability information 80 to low-power node 34a as part of a cell-change procedure (e.g. handover, primary carrier change in multi-carrier operation, PCell change in multi-carrier operation, RRC re-establishment, RRC connection release with re-direction). Alternatively, as noted above, low-power node 34a may receive capability information 80 from another radio access node that was previously serving wireless communication device 20a.

Capability information 80 may indicate to low-power node 34a whether wireless communication device 20a supports specific types of feedback schemes and/or whether wireless communication device 20a can adaptively switch between feedback schemes to facilitate interference protection. In the illustrated example, is it assumed that wireless communication device 20a can support at least one synchronous type of feedback and at least one asynchronous type of feedback and can adaptively switch between these feedback types. Thus, low-power node 34a may determine based on capability information 80 that wireless communication device 20a is capable of selecting a type of feedback scheme to use for uplink transmissions with low-power node 34a.

In the illustrated example, low-power node 34a also receives coordination information 82 from base station 32a providing information about a transmission pattern used by base station 32a in cell 50a which represents a potential or current aggressor cell to cell 50b. In particular embodiments, coordination information 82 may indicate one or more subframes that are configured for MBSFN ABS in cell 50a. In such embodiments, low-power node 34a may use coordination information 82 to identify one or more candidate subframes in which transmission activity by base station 32a in cell 50a will be reduced. Low-power node 34a may transmit coordination information 82 or other information generated based on coordination information 82 to wireless communication device 20*a*. For instance, in the illustrated example, low-power node 34*a* generates a restricted measurement pattern 84 to transmit to wireless communication device 20*a*. The restricted measurement pattern 84 may identify all, or a subset, of the candidate subframes.

Alternatively or additionally, low-power node 34*a* may be responsible for transmitting coordination information of its own to a potential aggressor cell such as base station 32*a* to facilitate coordinated operation with base station 32*a*. For example, if more than a threshold number or a threshold percentage of the wireless communication devices 20 served by low-power node 34*a* are capable of adaptively switching between a synchronous and an asynchronous type of feedback scheme, low-power node 34*a* may transmit coordination information to base station 32*a* requesting that base station 32*a* configured one or more its subframes as MBSFN ABS to allow low-power node 34 to take advantage of this capability. Or, low-power node 34*a* may transmit to base station 32*a* coordination information indicating the number or percentage of the wireless communication devices 20 served by low-power node 34*a* that have such capability, and base station 32*a* may take this factor into account when configuring its transmission pattern in the aggressor cell.

In the illustrated example, wireless communication device 20*a* is responsible for selecting the type of feedback scheme to be used. More specifically, in the illustrated example of FIG. 1A, wireless communication device 20*a* selects between synchronous and asynchronous feedback based on whether or not wireless communication device 20*a* is being served by a low-power node. As explained above, wireless communication device 20*a* may determine it is being served by a low-power node based on a device type associated with the serving radio access node, a measure of the transmission power, or any other suitable basis. In the illustrated example, wireless communication device 20*a* is configured to determine whether it is being served by a low-power node 34*a* based on whether or not it has received a restricted measurement pattern from its serving radio access node. Thus, wireless communication device 20*a* determines based on its receipt of restricted measurement pattern 84 that low-power node 34*a* is a low-power node.

In response to determining that its serving radio access node is a low-power node, wireless communication device 20*a* selects an asynchronous type of feedback scheme to use for uplink transmissions to low-power node 34*a*. Wireless communication device 20*a* may configure itself to receive an asynchronous type of feedback information. Wireless communication device 20*a* may also adapt other aspects of its operation (e.g., DRX/DTX settings) in response to selecting asynchronous feedback.

Once wireless communication device 20*a* has configured itself appropriately, wireless communication device 20*a* may begin making uplink data transmissions. In particular embodiments, wireless communication device 20*a* initiates uplink transmissions by sending a scheduling request to low-power node 34*a*. In response to the scheduling grant, low-power node 34*a* schedules wireless communication device 20*a* for transmission of uplink data and transmits scheduling information (e.g., a scheduling grant) to wireless communication device 20*a* indicating the transmission resources that wireless communication device 20*a* may use for the uplink transmission. After receiving the scheduling information, wireless communication device 20*a* transmits an uplink data transmission.

At an appropriate point after wireless communication device 20*a* was scheduled to make the uplink transmission, low-power node 34*a* determines whether or not it has received the scheduled uplink transmission. Low-power node 34*a* then generates feedback information indicating whether the uplink transmission was successfully received. Because in the illustrated example, wireless communication device 20*a* and low-power node 34*a* are using an asynchronous type of feedback scheme, low-power node 34*a* does not have to transmit the feedback information to wireless communication device 20*a* a fixed number of subframes after the uplink transmission was scheduled. As a result, low-power node 34*a* may have more flexibility to adjust the timing of the downlink feedback transmission so as to limit interference by the aggressor cell.

In particular embodiments, low-power node 34*a* may use knowledge of the transmission pattern used in the aggressor cell (here, cell 50*a*) to identify candidate subframes (e.g., subframes configured as MBSFN ABS) and then transmit the downlink feedback information to wireless communication device 20 during one of the candidate subframes. For example, low-power node 34*a* may transmit the feedback information in the next candidate subframe immediately following the subframe in which wireless communication device 20*a* was scheduled to make the uplink transmission, or may wait a minimum amount of time after the scheduled subframe and transmit the feedback information in the candidate subframe immediately after this minimum amount of time has elapsed.

Wireless communication device 20*a* receives the downlink feedback transmission and may respond to the feedback information in accordance with the specific feedback scheme being used. For example, in particular embodiments, if the downlink feedback information indicates that low-power node 34*a* did not successfully receive the uplink transmission, wireless communication device 20*a* may retransmit the uplink transmission.

Because an asynchronous type of feedback scheme may provide low-power node 34*a* greater flexibility in transmitting downlink feedback information, low-power node 34*a* may be able to transmit the downlink feedback transmission under more favorable interference conditions than would have been possible using a synchronous type of feedback scheme. This may result in reduced interference and greater reliability in the relevant downlink transmissions and may reduce the overhead resulting from excessive retransmissions. Thus, certain embodiments of wireless communication system 10 may provide numerous operational benefits. Nonetheless, specific individual embodiments of wireless communication system 10 may provide some, none, or all of these benefits.

Figure 6:
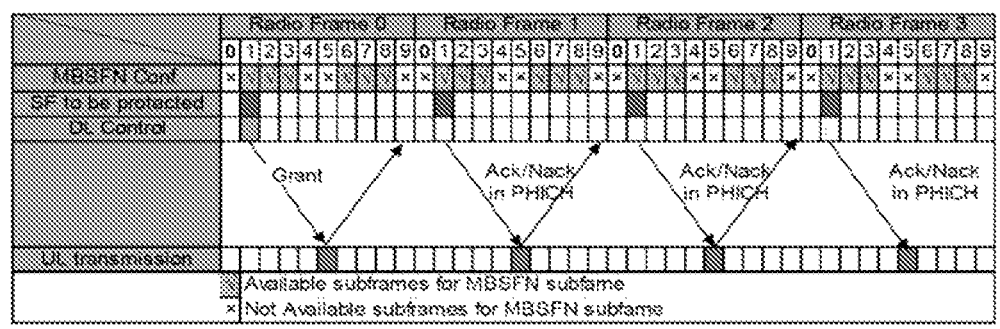
FIG. 6 illustrates another example of the relative timing of the downlink transmissions and candidate subframes from FIG. 5 when an example asynchronous HARQ scheme is used.

FIG. 6 shows an example of how an asynchronous type of feedback scheme can be used to help protect downlink transmissions. More specifically, FIG. 6 illustrates an example embodiment in which a wireless communication device 20 and a radio access node utilize asynchronous HARQ feedback to align HARQ feedback transmissions with a set of candidate subframes. In particular, under this example asynchronous feedback scheme, the radio access node is configured to transmit a responsive downlink feedback transmission in the first candidate subframe that occurs at least four subframes after the subframe in which the corresponding uplink transmission is scheduled.

In this example embodiment, the pre-defined feasible subset of candidate subframes for downlink transmissions include subframes marked as "MBSFN conf" in FIG. 6 (which are MBSFN-configurable subframes in the aggressor cell which may use an MBSFN ABS pattern). The subframes in which low-interference conditions are needed or desirable in the victim cell are marked as "SF to be protected." The subframes in which the downlink transmissions will occur are marked as "DL control," and the subframe for the bundled uplink transmissions triggering those downlink transmissions are marked as "UL transmission" in FIG. 6. (In particular embodiments, only a subset of the candidate subframes are used to protect the DL control transmissions and, in such embodiments, the subframes marked "DL control" may differ from those marked "SF to be protected.") In the example embodiment, a wireless communication device 20 is scheduled in the (1,0) subframe to transmit during the (5,0) subframe. (Here, (u,v) denotes the uth subframe of the vth radio frame.) In FIG. 6, the arrows leading from the subframe of the uplink transmission indicate the earliest subframe (i.e., the subframe 4 subframes later) in which low-power node 34a can transmit the responsive downlink feedback transmission. In the illustrated example, however, the serving radio access node waits until the next candidate subframe to transmit the downlink feedback transmission. Thus, serving radio access nodes transmits feedback information (e.g., ACK/NAK) in the (1,1) subframe. The process then repeats itself with uplink data transmissions occurring in the (5,1), (5,2), and (5,3) subframes and responsive downlink feedback transmissions occurring in the (1,2), (1,3) and (1,4) (not shown) subframes. As a result, in the illustrated example, all of the downlink feedback transmissions occur during candidate subframes (in this example, subframes configured for MBSFN ABS). Thus, as shown by a comparison of FIG. 4 and FIG. 6, use of an asynchronous type of feedback scheme may allow downlink feedback transmissions to be protected in situations in which a particular synchronous type of feedback scheme might not.

Figure 7:
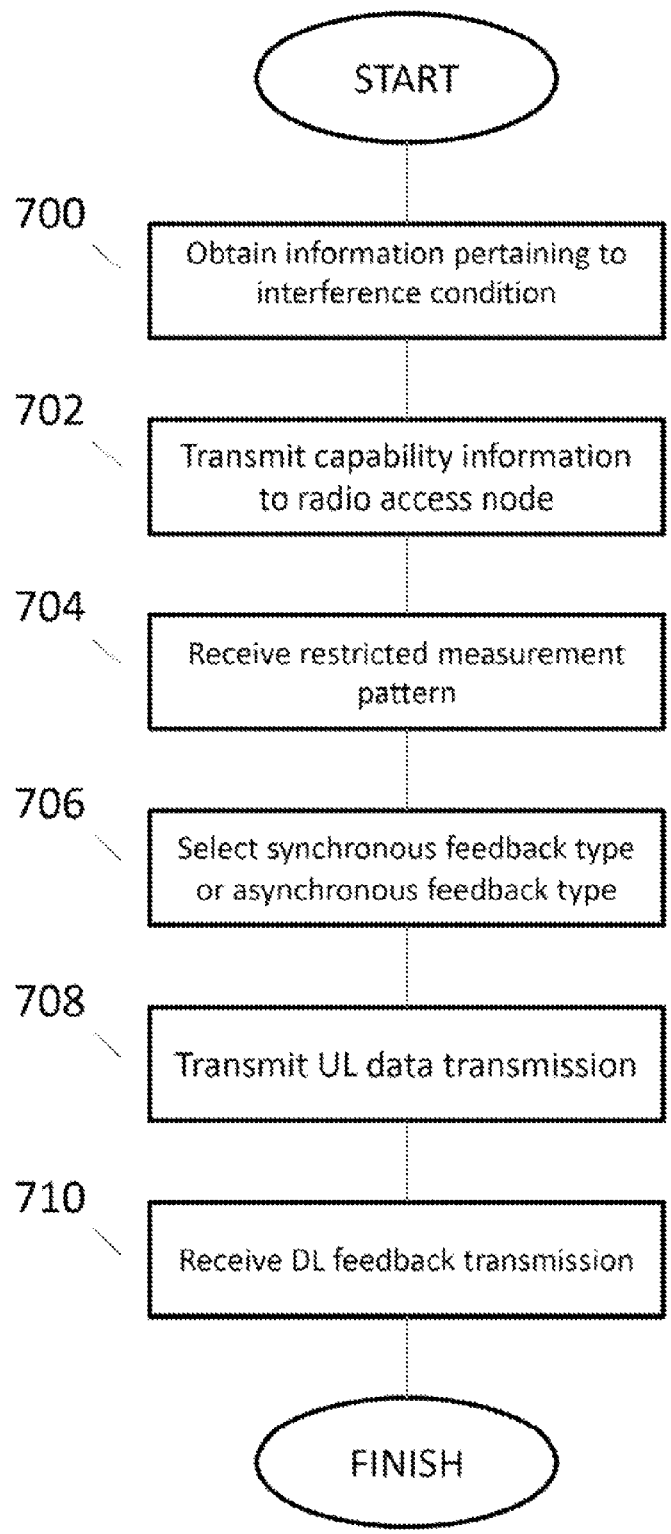
FIG. 7 is a flow chart illustrating example operation for a particular embodiment of a wireless communication device in adaptively selecting a type of feedback to use.

FIG. 7 is a flow chart illustrating example operation for a wireless communication device 20 in adaptively selecting between a synchronous type of feedback scheme and an asynchronous type of feedback scheme. More specifically, FIG. 7 illustrates an example embodiment in which the wireless communication device 20 is responsible for deciding whether a synchronous or an asynchronous feedback scheme should be used. The steps illustrated in FIG. 7 may be combined, modified, or deleted where appropriate. Additional steps may also be added to the example operation. Furthermore, the described steps may be performed in any suitable order.

Operation begins in FIG. 7 with a wireless communication device 20 (in this example, wireless communication device 20a of FIG. 1A) obtaining information pertaining to an interference condition at step 700. The interference condition relates to interference experienced by wireless communication device 20a. Wireless communication device 20a may obtain the relevant information from another element of wireless communication system 10 (e.g., a radio access node serving wireless communication device 20a) or as a result of its own measurements, detections, calculations, and/or other operations. Thus, in particular embodiments, obtaining the relevant information may involve receiving the information from another device (e.g., low-power node 34a) or accessing information stored or generated locally by wireless communication device 20a.

In particular embodiments, wireless communication device 20a may provide its serving radio access node (in this example, low-power node 34a) information about its capabilities in regards to the use of one or more types of feedback schemes. Thus, at step 702, wireless communication device 20a may transmit capability information to a radio access node serving wireless communication device 20a. The capability information indicates a capability of wireless communication device 20a to support one or both of a synchronous and an asynchronous type of feedback scheme or a capability to adaptively switch between a synchronous and an asynchronous type of feedback scheme.

In particular embodiments, low-power node 34a may transmit information to wireless communication device 20a for wireless communication device 20a to use in selecting an appropriate type of feedback scheme, to configure itself to use the selected feedback scheme, and/or to configure other aspects of its operations that may be affected by the choice of feedback scheme. For example, low-power node 34a may transmit information indicating the conditions under which wireless communication device 20a should select an asynchronous or a synchronous type of feedback scheme. In the illustrated example, low-power node 34a transmits to wireless communication device 20a a restricted measurement pattern that indicates subframes in which favorable interference conditions should occur with respect to one or more aggressor cells. Thus, wireless communication device 20 receives a restricted measurement pattern from low-power node 34a at step 704. As noted above, any of the steps of FIG. 7 may be combined, and in particular embodiments, the interference condition may relate to whether wireless communication device 20a has been configured with a restricted measurement pattern, and thus, the restricted measurement pattern may represent the information pertaining to the interference condition. Thus, in such embodiments, steps 700 and 704 may represent a single step involving the receipt of a restricted measurement pattern.

At step 706, wireless communication device 20a selects one of a synchronous feedback type and an asynchronous feedback type for the wireless communication device based on the obtained information pertaining to the interference condition. In the illustrated example, it is assumed that low-power node 34a duplicates the decision on its own based on the same considerations, and wireless communication device 20a and low-power node 34 select the same type of feedback scheme. In alternative embodiments, however, wireless communication device 20a may additionally be responsible for transmitting to low-power node 34a an indication of what type of feedback scheme wireless communication device 20a selected.

After any appropriate configuration based on the selected type of feedback scheme, wireless communication device 20a may begin making uplink transmissions in accordance with the selected feedback scheme. Thus, at step 708, wireless communication device 20a transmits an uplink data transmission. Low-power node 34 responds to the uplink transmission by transmitting a downlink feedback transmission that carries feedback information (e.g., a HARQ ACK/NAK bit) indicating whether low-power node 34a successfully received the uplink transmission. As a result, wireless communication device 20a receives downlink feedback transmission at step 710. The timing of the downlink feedback transmission relative to the uplink transmission will depend on the selected type of feedback. Wireless communication device 20a may then respond to the feedback information as appropriate according to the selected feedback scheme. For example, in particular embodiments, if the received feedback information indicates that low-power node 34a did not successfully receive the uplink transmission, wireless communication device 20a may retransmit the uplink transmission. After any appropriate response to the feedback information from wireless communication device 20a, operation of wireless communication device 20a with respect to making the uplink transmission may end as shown in FIG. 7.

Figure 8A:
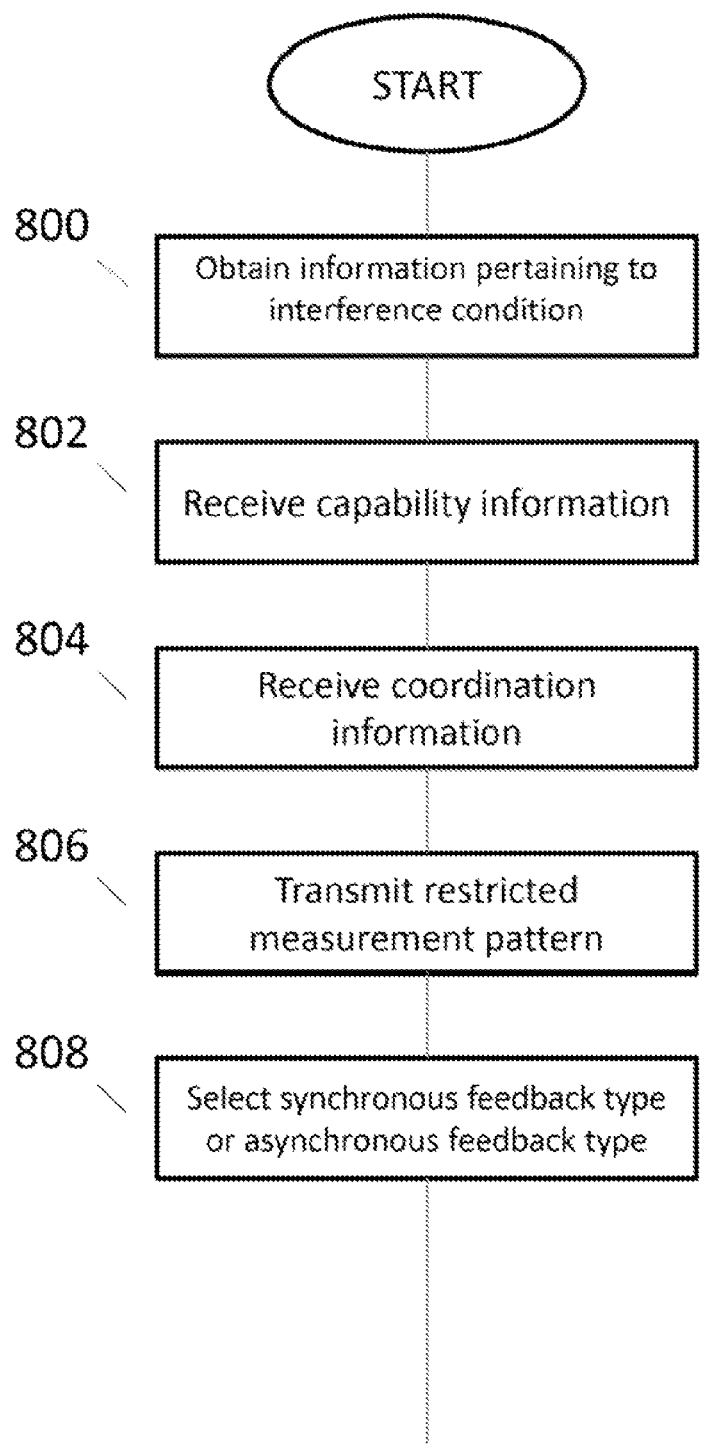
FIGS. 8A-8B are a flow chart illustrating example operation for a particular embodiment of a radio access node in adaptively selecting a type of feedback to use.
Figure 8B:
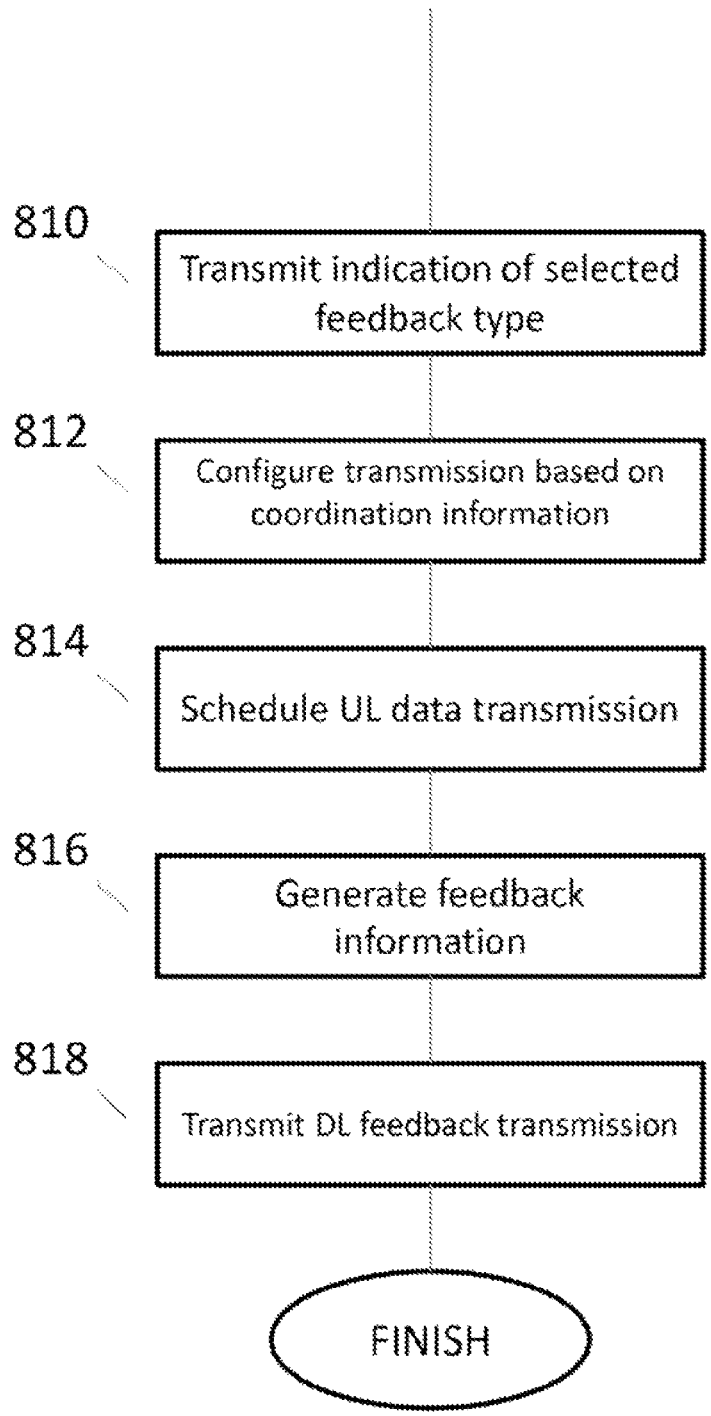

FIGS. 8A-8B are a flow chart illustrating example operation for a radio access node of access network 30 in adaptively selecting between a synchronous type of feedback scheme and an asynchronous type of feedback scheme. More specifically, FIGS. 8A-8B illustrate an example embodiment in which the radio access node (specifically, low-power node 34a from FIG. 1A) is responsible for deciding whether a synchronous or an asynchronous feedback scheme should be used for a particular wireless communication device 20 served by the radio access node (here, wireless communication device 20a). The steps illustrated in FIGS. 8A-8B may be combined, modified, or deleted where appropriate. Additional steps may also be added to the example operation. Furthermore, the described steps may be performed in any suitable order.

Operation begins in FIGS. 8A-8B with low-power node 34a obtaining information pertaining to an interference condition at step 800. The interference condition relates to interference experienced by one or more wireless communication devices 20 served by low-power node 34a or by one or more cells 50 served by low-power node 34a. Low-power node 34a may obtain the relevant information from another element of wireless communication system 10 (e.g., a potential aggressor cell, wireless communication device 20a) or as a result of its own measurements, detections, calculations, and/or other operations. Thus, in particular embodiments, obtaining the relevant information may involve receiving the information from another device or accessing information stored or generated locally by low-power node 34a.

In particular embodiments, wireless communication devices 20 may transmit capability information to their serving radio access nodes. As explained above, this capability information may indicate whether wireless communication device 20a supports one or both of a synchronous and an asynchronous type of feedback scheme and/or whether wireless communication device 20a is capable of adaptively switching between a synchronous and an asynchronous type of feedback scheme. In the illustrated example, low-power node 34a receives, at step 802, capability information from wireless communication device 20a indicating, implicitly or explicitly, that wireless communication device 20a is capable of supporting both synchronous and asynchronous types of feedback schemes and is capable of adaptively switching between a synchronous feedback scheme and an asynchronous one. In particular embodiments, low-power node 34a may forward this capability information to another node (e.g., a potential aggressor node or a handover target node) upon receiving it from wireless communication device 20a or at an appropriate time later (e.g., when handing wireless communication device 20 over to a target cell).

In particular embodiments, low-power node 34a may receive coordination information from a radio access node serving a potential aggressor cell (here, base station 32a serving cell 50a) that indicates a transmission pattern or describes other aspects of the operation of the aggressor node and may use this information in selecting a feedback type or in otherwise reducing the inter-cell interference caused by the potential aggressor cell. For instance, in the example embodiment, low-power node 34a receives coordination information that indicates the MBSFN ABS configuration of the potential aggressor cell, at step 804. As noted above, any of the steps of FIGS. 8A-8B may be combined, and in particular embodiments, the interference condition(s) used by low-power node 34a to select a feedback type may relate to the feedback capabilities of wireless communication device 20a and/or to the configuration of the potential aggressor cell. Thus, either or both of the coordination information and the capability information received by low-power node 34 may represent the information pertaining to the interference condition. Thus, in such embodiments, steps 800 and 802 may represent a single step involving the receipt of capability information from wireless communication device 20a. Similarly, steps 800 and 804 may represent a single step involving the receipt of coordination information from base station 32a.

In particular embodiments, radio access nodes may transmit information to wireless communication devices 20 to be used to configure the relevant wireless communication devices 20 to use a selected feedback scheme and/or to configure other aspects of their operations that may be affected by the choice of feedback scheme. For example, in the illustrated example, low-power node 34a transmits to wireless communication device 20a a restricted measurement pattern that indicates subframes in which favorable interference conditions should occur with respect to one or more aggressor cells at step 806.

At step 808, low-power node 34a selects one of a synchronous type of feedback and an asynchronous type of feedback for wireless communication device 20a based on the obtained information pertaining to the interference condition. Low-power node 34a then transmits an indication of the selected feedback type to wireless communication device 20a at step 810.

In particular embodiments, radio access node may also transmit coordination to another radio access node serving a potential aggressor cell to request the aggressor node coordinate its transmission with those of the victim node. The coordination information may indicate feedback capabilities of one or more wireless communication devices 20 served by the victim node, a type of feedback selected from one or more wireless communication devices 20, or some other aspect of how the victim node is configured to transmit downlink feedback transmissions. The victim node may then configure its transmission based on the received coordination information. For example, if the coordination information indicates that a certain number or a certain percentage of the wireless communication devices 20 served by the victim node are capable of using an asynchronous type of feedback scheme, the aggressor node may configure one or more subframes in the aggressor cell as MBSFN ABS to allow the victim node to take advantage of these asynchronous capabilities to protect downlink feedback transmissions. This is shown in FIGS. 8A-8B at step 812.

After any appropriate configuration based on the selected type of feedback scheme, wireless communication device 20a may begin making uplink transmissions in accordance with the selected feedback scheme. Thus, at step 814, low-power node 34a schedules an uplink data transmission for wireless communication device 20a. When low-power node 34a receives the scheduled uplink transmission or the subframe in which the uplink transmission was scheduled to be received passes, low-power node 34a generates feedback information (e.g., a HARQ ACK/NACK bit) indicating whether low-power node 34a successfully received the uplink transmission, as shown at step 816 in FIGS. 8A-8B.

Low-power node 34 then transmits a downlink feedback transmission to wireless communication device 20a in accordance with the selected feedback type at step 818. The downlink feedback transmission carries the generated feedback information. The timing of the downlink feedback transmission relative to the uplink transmission will depend on the selected type of feedback. In the illustrated example, it is assumed that low-power node 34a selected an asynchronous type of feedback. As a result, low-power node 34a may have some flexibility in regards to when the downlink feedback transmission is made. Thus, low-power node 34a may be able to transmit the downlink subframe during a subframe that is protected from interference by the aggressor cell (e.g., a subframe configured as MSBFN ABS in the aggressor cell). Wireless communication device 20a may then respond to the feedback information as appropriate according to the selected feedback scheme. For example, in particular embodiments, if the received feedback information indicates that low-power node 34a did not successfully receive the uplink transmission, wireless communication device 20a may retransmit the uplink transmission. After any appropriate response to the feedback information from wireless communication device 20a, operation of low-power node 34a with respect to making the uplink transmission may end as shown in FIGS. 8A-8B.

Although FIGS. 8A-8B illustrates, for the sake of simplicity, an example in which low-power node 34a selects a feedback type for a single wireless communication device 20, low-power node 34 may, in particular embodiments, serve multiple different wireless communication devices 20 at any given time. In such embodiments, low-power node 34a may make a select a single feedback type to use for all wireless communication devices 20 served by low-power node 34a (e.g., based on an interference condition that is not unique to individual wireless communication devices 20, such as the fact that low-power node 34a is a "low-power" node) or may repeat the selection process for other wireless communication devices 20 served by low-power node 34a.

For example, low-power node 34a may obtain information for each of multiple wireless communication devices 20 in regards to the interference condition(s) (e.g., in regards to a capability of the devices to use a particular feedback type or a particular interference mitigation technique or in regards to some other interference condition that may differ between wireless communication devices 20). In such embodiments, low-power node 34a may select one or more asynchronous feedback types for a first group of wireless communication devices 20 for which the interference condition is satisfied and select one or more synchronous feedback types for a second group of wireless communication devices for which the interference condition is not satisfied. Low-power node 34a may then transmit downlink feedback transmission to the first group of wireless communication devices 20 in accordance with the selected asynchronous feedback type(s) and transmit feedback information to the second group of wireless communication devices 20 in accordance with the selected synchronous feedback type(s). As a result, in such embodiments, low-power node 34a may be able to advantageously vary the feedback type used for different wireless communication devices 20 as appropriate.

Figure 9:
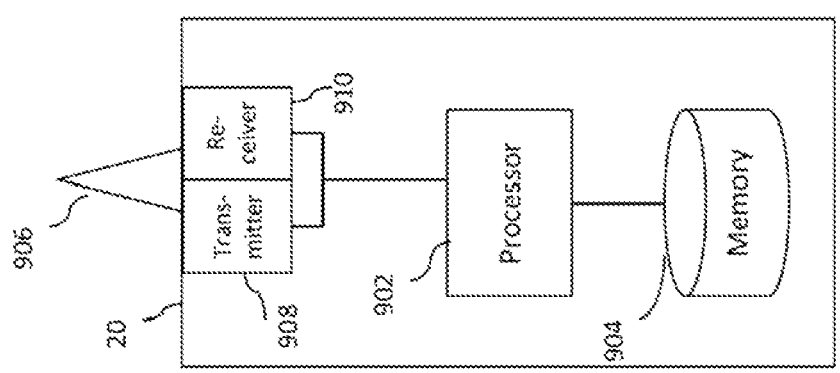
FIG. 9 is a block diagram illustrating a particular embodiment of a wireless communication device.

FIG. 9 is a block diagram illustrating in greater detail the contents of a particular embodiment of a wireless communication device 20 that may be configured to select a feedback type for use with uplink data transmissions made to its serving radio access node or to adapt the feedback type used in response to signaling from its serving radio access node. As shown in FIG. 9, the example embodiment of wireless communication device 20 includes a device processor 902, a device memory 904, an antenna 906, a transmitter 908, and a receiver 910.

Device processor 902 may represent or include any form of processing component, including dedicated microprocessors, general-purpose computers, or other forms of electronic circuitry capable of processing electronic information. Examples of device processor 902 include field-programmable gate arrays (FPGAs), programmable microprocessors, digital signal processors (DSPs), application-specific integrated circuits (ASICs), and any other suitable specific- or general-purpose processors. Although FIG. 9 illustrates, for the sake of simplicity, an embodiment of wireless communication device 20 that includes a single device processor 902, wireless communication device 20 may include any number of device processors 902 configured to interoperate in any appropriate manner.

Device memory 904 stores configuration information obtained by wireless communication device 20, such as an indication of a selected feedback scheme, a restricted measurement pattern used by wireless communication device 20, DRX/DTX settings, or any other configuration information used by wireless communication device 20. Device memory 904 may also store capability information for wireless communication device 20. Additionally, device memory 904 may also store processor instructions for device processor 902, coding algorithms, transmission parameters, and/or any other data utilized by wireless communication device 20 during operation. Device memory 904 may comprise any collection and arrangement of volatile or non-volatile, local or remote devices suitable for storing data, such as random access memory (RAM), read only memory (ROM), magnetic storage, optical storage, or any other suitable type of data storage components. Although shown as a single element in FIG. 9, device memory 904 may include one or more physical components local to or remote from wireless communication device 20.

Antenna 906 represents any suitable conductor capable of receiving and transmitting wireless signals. Transmitter 908 transmits radiofrequency (RF) signals over antenna 906, and receiver 910 receives from antenna 906 RF certain signals transmitted by access network 30. Although the example embodiment in FIG. 9 includes certain numbers and configurations of antennas, receivers, and transmitters, alternative embodiments of wireless communication device 20 may include any suitable number of these components. Additionally, transmitter 908, receiver 910, and/or antenna 906 may represent, in part or in whole, the same physical components. For example, particular embodiments of wireless communication device 20 include a transceiver representing both transmitter 908 and receiver 910.

Figure 10:
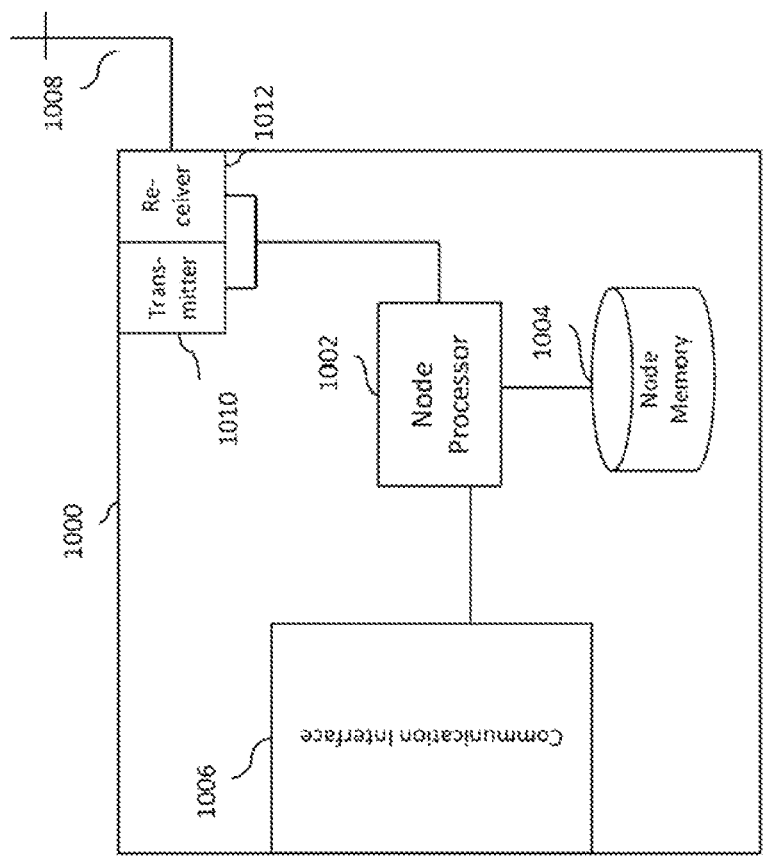
FIG. 10 is a block diagram illustrating a particular embodiment of a radio access node.

FIG. 10 is a block diagram illustrating in greater detail the contents of a particular embodiment of a radio access node 1000 that may be to select a feedback type to use in making downlink feedback transmissions to wireless communication devices 20 served by radio access nodes 1000. Particular embodiments of the example radio access node 1000 may be capable of selecting a feedback type to facilitate protection of the downlink feedback transmissions from inter-cell interference as described above, for example, with respect to FIGS. 8A-8B. As shown in FIG. 10, the example embodiment of network node 1000 includes a node processor 1002, a node memory 1004, a communication interface 1006, an antenna 1008, a transmitter 1010, and a receiver 1012.

Node processor 1002 may represent or include any form of processing component, including dedicated microprocessors, general-purpose computers, or other forms of electronic circuitry capable of processing electronic information. Examples of node processor 1002 include field-programmable gate arrays (FPGAs), programmable microprocessors, digital signal processors (DSPs), application-specific integrated circuits (ASICs), and any other suitable specificor general-purpose processors. Although FIG. 10 illustrates, for the sake of simplicity, an embodiment of network node 1000 that includes a single node processor 1002, network node 1000 may include any number of node processors 1002 configured to interoperate in any appropriate manner.

Node memory 1004 stores configuration information obtained by radio access node 1000, such as—an indication of a selected feedback scheme, coordination information received from other radio access nodes, DRX/DTX settings for served wireless communication devices 20, or any other configuration information used by radio access node 1000. Node memory 1004 may also store processor instructions for node processor 1002, coding algorithms, transmission parameters, and/or any other data utilized by radio access node 1000 during operation. Node memory 1004 may comprise any collection and arrangement of volatile or non-volatile, local or remote devices suitable for storing data, such as random access memory (RAM), read only memory (ROM), magnetic storage, optical storage, or any other suitable type of data storage components. Although shown as a single element in FIG. 10, node memory 1004 may include one or more physical components local to or remote from radio access node 1000.

Communication interface 1006 comprises electronic circuitry and other components suitable to permit radio access node 1000 to communicate with other radio access nodes and/or other elements of access network 30 and core network 40. For example, in embodiments in which radio access node 1000 exchanges coordination information with other network nodes in access network 30, communication interface 1006 may represent circuitry capable of communicating over an X2 interface between radio access node 1000 and other nodes of access network 30.

Antenna 1008 represents any suitable conductor capable of receiving and transmitting wireless signals. Transmitter 1010 transmits radiofrequency (RF) signals over antenna 1008, and receiver 1012 receives from antenna 1008 RF certain signals transmitted by wireless communication devices 20. Although the example embodiment in FIG. 10 includes certain numbers and configurations of antennas, receivers, and transmitters, alternative embodiments of radio access node 1000 may include any suitable number of these components. Additionally, transmitter 1010, receiver 1012, and/or antenna 1008 may represent, in part or in whole, the same physical components. For example, particular embodiments of radio access node 1000 include a transceiver representing both transmitter 1010 and receiver 1012. Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method of configuring communication of feedback information in a wireless communication network, the method comprising:
    obtaining information pertaining to an interference condition, wherein the interference condition relates to interference experienced by a wireless communication device in one or more of the candidate subframes in a first cell serving the wireless communication device, wherein each of the candidate subframes satisfies a candidate condition that relates to transmissions in a second cell during that subframe;
    selecting one of a synchronous feedback type and an asynchronous feedback type for the wireless communication device based on the obtained information;
    receiving and/or transmitting feedback information for an uplink transmission in accordance with the selected feedback type; and
    obtaining feedback capability information indicating one or more feedback types supported by the wireless communication device and/or adaptive switching between the two, wherein selecting the feedback type comprises selecting the feedback type based on the feedback capability information and the obtained information pertaining to the interference condition, wherein
        obtaining feedback capability information comprises receiving feedback capability information from a plurality of wireless communication devices that are served by a first cell, and the method further comprising:
        determining a number of wireless communication devices served by the first cell that have a first feedback capability; and
        setting a transmission pattern for a second cell that neighbors the first cell based on whether the number of wireless communication devices that have the first feedback capability is greater than a threshold number.

2. The method of claim 1, wherein:
the interference condition relates to whether a maximum transmission power of a first cell serving the wireless communication device exceeds a threshold; and
selecting the feedback type comprises selecting the asynchronous feedback type in response to determining the maximum transmission power of the first cell does not exceed the threshold.

3. The method of claim 1, wherein:
the interference condition relates to whether the wireless communication device is operating within a cell range expansion zone of a first cell serving the wireless communication device; and
selecting the feedback type comprises selecting the asynchronous feedback type in response to determining that the wireless communication device is operating within a cell range expansion zone of the first cell.

4. The method of claim 1, wherein:
the interference condition relates to an ability of the wireless communication device to mitigate the interference experienced by the wireless communication device; and
selecting the feedback type comprises selecting the asynchronous feedback type when the wireless communication device applies a first mitigation technique and selecting the synchronous feedback when the wireless communication device applies a second mitigation technique.

5. The method of claim 1, wherein:
the wireless communication device is served by a first cell;
the interference condition relates to a transmission pattern used by a second cell; and
selecting the feedback type comprises selecting the feedback type based on whether one or more subframes that are designated as almost blank subframes (ABS) in the second cell comprise multicast-broadcast single frequency network (MBSFN) subframes.

6. The method of claim 1, wherein the interference condition relates to a signal strength measured by the wireless communication device.

7. The method of claim 1, wherein the interference condition relates to whether the wireless communication device has been configured with a restricted measurement pattern or has received assistance data for interference handling.

8. The method of claim 1, wherein the interference condition relates to whether a power level of a feedback channel associated with wireless communication device differs from a reference power level by more than a threshold amount.

9. The method of claim 1, wherein the interference condition relates to whether a first cell serving the wireless communication device is utilizing persistent or semi-persistent scheduling.

10. The method of claim 1, setting the transmission pattern for the second cell comprises setting the second cell to transmit one or more multicast-broadcast single frequency network (MBSFN) subframes that are configured as Almost Blank Subframes (ABS).

11. The method of claim 1, further comprising adapting discontinuous reception (DRX) mode of the wireless communication device and/or a discontinuous transmission (DTX) mode, in response to the selected feedback type.

12. The method of claim 1, wherein:
obtaining information pertaining to an interference condition comprises obtaining information pertaining to the interference condition for each of a plurality of wireless communication devices;
selecting a feedback type comprises:
  selecting an asynchronous feedback type for a first group of wireless communication devices for which the interference condition is satisfied;
  selecting a synchronous feedback type for a second group of wireless communication devices for which the interference condition is not satisfied; and
receiving or transmitting feedback information comprises:
  transmitting feedback information to the first group of wireless communication device in accordance with the feedback type selected for the first group; and
  transmitting feedback information to the second group of wireless communication devices in accordance with the feedback type selected for the first group.

13. The method of claim 1, further comprising adapting a radio link management (RLM) procedure based on the selected feedback type.

14. The method of claim 1, wherein the interference condition comprises the candidate condition.

15. The method of claim 14, wherein:
the candidate subframes belong to a restricted measurement pattern configured in the first cell; and
the candidate condition that relates to transmissions in the second cell comprises a condition that the candidate subframes comprise subframes designated as almost blank subframes (ABS) in the second cell.

16. An apparatus for configuring communication in a wireless communication system, the apparatus comprising:
a transmitter configured to transmit information wirelessly;
a receiver configured to receive information transmitted wirelessly; and
a processor configured to:
  obtain information pertaining to an interference condition, wherein the interference condition relates to interference experienced by a wireless communication device in one or more of the candidate subframes in a first cell serving the wireless communication device, wherein each of the candidate subframes satisfies a candidate condition that relates to transmissions in a second cell during that subframe;
  select one of a synchronous feedback type and an asynchronous feedback type for the wireless communication device based on the obtained information;
  receive feedback information for an uplink transmission in accordance with the selected feedback type via the receiver or transmit feedback information for an uplink transmission in accordance with the selected feedback type using the transmitter; and
  obtain feedback capability information indicating one or more feedback types supported by the apparatus, wherein the processor is configured to select the feedback type by selecting the feedback type based on the feedback capability information and the obtained information pertaining to the interference condition, wherein
the processor is configured to obtain feedback capability information by receiving feedback capability information from a plurality of wireless communication devices that are served by a first cell, and the processor is further configured to:
  determine a number of wireless communication devices served by the first cell that have a first feedback capability; and
  set a transmission pattern for a second cell that neighbors the first cell based on whether the number of wireless communication devices that have the first feedback capability is greater than a threshold number.

17. The apparatus of claim 16, wherein the interference condition relates to whether a maximum transmission power of a first cell serving the wireless communication device exceeds a threshold, and the processor is configured to select the feedback type by selecting the asynchronous feedback type in response to determining the maximum transmission power of the first cell does not exceed the threshold.

18. The apparatus of claim 16, wherein the interference condition relates to whether the wireless communication device is operating within a cell range expansion zone of a first cell serving the wireless communication device, and wherein the processor is configured to select the feedback type by selecting the asynchronous feedback type in response to determining that the wireless communication device is operating within a cell range expansion zone of the first cell.

19. The apparatus of claim 16, wherein the interference condition relates to an ability of the wireless communication device to mitigate the interference experienced by the wireless communication device, and wherein the processor is configured to select the feedback type by selecting the asynchronous feedback type in response to determining that the wireless communication device is operating within a cell range expansion zone of the first cell.

20. The apparatus of claim 16, wherein:
the apparatus comprises a wireless communication device served by a first cell;
the interference condition relates to a transmission pattern used by a second cell; and
the processor is configured to select the feedback type by selecting the feedback type based on whether one or more subframes that are designated as almost blank subframes (ABS) in the second cell comprise multicast-broadcast single frequency network (MBSFN) subframes.

21. The apparatus of claim 16, wherein the interference condition relates to a signal strength measured by the apparatus.

22. The apparatus of claim 16, wherein the interference condition relates to whether the wireless communication device has been configured with a restricted measurement pattern.

23. The apparatus of claim 16, wherein the interference condition relates to whether a power level of a feedback channel associated with wireless communication device differs from a reference power level by more than a threshold amount.

24. The apparatus of claim 16, wherein the interference condition relates to whether a first cell serving the apparatus is utilizing persistent scheduling.

25. The apparatus of claim 16, wherein the processor is configured to set the transmission pattern for the second cell by setting the second cell to transmit one or more multicast-broadcast single frequency network (MBSFN) subframes that are configured as Almost Blank Subframes (ABS).

26. The apparatus of claim 16, wherein the processor is further configured to set a discontinuous reception (DRX) mode of the apparatus based on the feedback capability information.

27. The apparatus of claim 16, wherein the processor is configured to:

obtain information pertaining to an interference condition by obtaining information pertaining to the interference condition for each of a plurality of wireless communication devices;
select a feedback type by:
  selecting an asynchronous feedback type for a first group of wireless communication devices for which the interference condition is satisfied;
  selecting a synchronous feedback type for a second group of wireless communication devices for which the interference condition is not satisfied; and
receive or transmit feedback information by:
  transmitting feedback information to the first group of wireless communication device in accordance with the feedback type selected for the first group; and
  transmitting feedback information to the second group of wireless communication devices in accordance with the feedback type selected for the first group.

28. The apparatus of claim 16, wherein the processor is further configured to adapt a radio link management (RLM) procedure based on the selected feedback type.

29. The apparatus of claim 16, wherein the interference condition comprises the candidate condition.

30. The apparatus of claim 29, wherein:
the candidate subframes belong to a restricted measurement pattern configured in the first cell; and
the candidate condition that relates to transmissions in the second cell comprises a condition that the candidate subframes comprise subframes designated as almost blank subframes (ABS) in the second cell.

\* \* \* \* \*